US009439446B2

(12) United States Patent
McGill et al.

(10) Patent No.: US 9,439,446 B2
(45) Date of Patent: Sep. 13, 2016

(54) DISPENSING APPARATUS

(71) Applicant: McGill Technology Limited, Kent (GB)

(72) Inventors: Shane Robert McGill, Kent (GB); Martin White, Kent (GB)

(73) Assignee: MCGILL TECHNOLOGY LIMITED, Kent (GB)

( * ) Notice: Subject to any disclaimer, the term of this patent is extended or adjusted under 35 U.S.C. 154(b) by 0 days.

(21) Appl. No.: 14/711,298

(22) Filed: May 13, 2015

(65) Prior Publication Data

US 2015/0237884 A1 Aug. 27, 2015

Related U.S. Application Data

(62) Division of application No. 13/809,732, filed as application No. PCT/GB2011/051348 on Jul. 18, 2011.

(30) Foreign Application Priority Data

| Jul. 16, 2010 | (GB) | 1012009.5 |
| Oct. 29, 2010 | (GB) | 1018311.9 |
| Jan. 20, 2011 | (GB) | 1100978.4 |
| Mar. 18, 2011 | (GB) | 1104630.7 |

(51) Int. Cl.

| B67D 1/00 | (2006.01) |
| A23G 9/28 | (2006.01) |
| A23G 9/04 | (2006.01) |
| B65D 35/30 | (2006.01) |
| B65D 35/40 | (2006.01) |
| A23G 9/22 | (2006.01) |

(52) U.S. Cl.
CPC .............. *A23G 9/287* (2013.01); *A23G 9/045* (2013.01); *A23G 9/227* (2013.01); *A23G 9/28* (2013.01); *B65D 35/30* (2013.01); *B65D 35/40* (2013.01)

(58) Field of Classification Search
None
See application file for complete search history.

(56) References Cited

U.S. PATENT DOCUMENTS

| 593,806 A | 11/1897 | Keenan |
| 1,365,252 A | 1/1921 | Langill |

(Continued)

FOREIGN PATENT DOCUMENTS

| GB | 457 772 | 12/1936 |
| GB | 479077 | 1/1938 |

(Continued)

OTHER PUBLICATIONS

English Translation of Chinese Office Action dated Nov. 5, 2013 issued in Chinese Patent Application No. 201180033694.3, 16 pp.
Japanese Office Action dated Jun. 10, 2014 issued in Japanese Patent Application No. 2013- 519164, 9 pp.
Office Action dated Apr. 10, 2014 issued in U.S. Appl. No. 13/809,689, 14 pp.

(Continued)

*Primary Examiner* — Patrick M Buechner
*Assistant Examiner* — Randall Gruby
(74) *Attorney, Agent, or Firm* — Nixon & Vanderhye P.C.

(57) ABSTRACT

Individual portions of ice cream are dispensed from a bulk container. A motor drives a lead screw, to expand a scissor linkage and drive a dispensing head against the bulk container. Pressure applied to the container causes it to collapse and discharge ice cream from an outlet. The lead screw is orthogonal with the movement of the dispensing head and the axis of collapse of the container. The container, motor and lead screw are carried on a drawer which is slidably mounted in a refrigerated housing. Pressure is monitored to regulate operation of the motor. An encoder controls the motor for a specific portion size.

12 Claims, 15 Drawing Sheets

(56) References Cited

U.S. PATENT DOCUMENTS

| | | | |
|---|---|---|---|
| 1,374,263 A | 4/1921 | Watson | |
| 1,498,813 A | 6/1924 | Sankela | |
| 1,885,170 A | 11/1932 | Anderson | |
| 1,903,464 A | 4/1933 | Konanz | |
| 1,904,364 A | 4/1933 | Fullmer | |
| 1,982,642 A | 12/1934 | Curok | |
| 2,455,412 A * | 12/1948 | Fonville | D01G 15/20 19/105 |
| 2,508,934 A | 5/1950 | Berg | |
| 2,899,110 A | 8/1959 | Parker | |
| 3,083,877 A | 4/1963 | Gash | |
| 3,367,545 A | 2/1968 | Cook | |
| 3,471,066 A | 10/1969 | Micallef | |
| 3,568,803 A | 3/1971 | See et al. | |
| 3,606,255 A | 9/1971 | Stevens | |
| 3,623,707 A | 11/1971 | Klopp | |
| 3,741,524 A * | 6/1973 | Morgan | B66F 3/22 254/122 |
| 3,759,426 A | 9/1973 | Kane et al. | |
| 3,759,429 A * | 9/1973 | Ardito | B65D 47/283 222/546 |
| 3,854,629 A | 12/1974 | Blieberger | |
| 3,939,887 A * | 2/1976 | Scarnato | B65D 1/0292 206/218 |
| 3,939,888 A | 2/1976 | Scarnato | |
| 4,157,771 A | 6/1979 | Smith | |
| 4,213,545 A | 7/1980 | Thompson et al. | |
| 4,258,866 A | 3/1981 | Bergman | |
| 4,405,116 A | 9/1983 | Eisenberg | |
| 4,417,610 A | 11/1983 | Waldström et al. | |
| 4,420,948 A | 12/1983 | Savage | |
| 4,426,024 A | 1/1984 | Hogan et al. | |
| 4,638,610 A | 1/1987 | Heikkinen | |
| 4,707,997 A * | 11/1987 | Bigler | A23G 9/285 222/334 |
| 4,749,169 A | 6/1988 | Pickles | |
| 4,779,774 A | 10/1988 | Morel | |
| 4,846,376 A | 7/1989 | Palmer | |
| 4,867,277 A | 9/1989 | Sloan | |
| 4,889,262 A | 12/1989 | Toms | |
| 4,927,589 A | 5/1990 | Egusa et al. | |
| 4,941,797 A | 7/1990 | Smillie, III | |
| 4,943,034 A | 7/1990 | Wagnon | |
| 4,991,743 A | 2/1991 | Walker | |
| 5,048,724 A | 9/1991 | Thomas | |
| 5,069,364 A | 12/1991 | McGill | |
| 5,104,005 A | 4/1992 | Schneider et al. | |
| 5,150,820 A | 9/1992 | McGill | |
| 5,152,425 A | 10/1992 | Baudin | |
| 5,207,357 A | 5/1993 | Aronie et al. | |
| 5,242,082 A | 9/1993 | Giannuzzi | |
| 5,244,277 A * | 9/1993 | Broussalian | A23G 9/228 222/30 |
| 5,262,706 A | 11/1993 | Hollingsworth | |
| 5,265,764 A | 11/1993 | Rowe et al. | |
| 5,269,428 A | 12/1993 | Gilbert | |
| 5,269,762 A * | 12/1993 | Armbruster | A61M 5/20 604/131 |
| 5,287,762 A | 2/1994 | Bonzak | |
| 5,333,761 A | 8/1994 | Davis et al. | |
| 5,341,958 A | 8/1994 | Bayat et al. | |
| 5,370,250 A | 12/1994 | Gilbert | |
| 5,379,855 A | 1/1995 | Juang | |
| 5,407,093 A | 4/1995 | McGill | |
| 5,450,988 A | 9/1995 | Jerdee | |
| 5,464,120 A | 11/1995 | Alpers et al. | |
| 5,499,747 A | 3/1996 | Quennessen | |
| 5,501,368 A | 3/1996 | Brandhorst et al. | |
| 5,505,336 A | 4/1996 | Montgomery et al. | |
| 5,593,137 A | 1/1997 | Johnson | |
| 5,632,415 A | 5/1997 | McGill | |
| 5,695,248 A | 12/1997 | Bell | |
| 5,749,496 A | 5/1998 | DeJonge et al. | |
| 5,775,533 A | 7/1998 | Schroeder | |
| 5,913,342 A | 6/1999 | McGill | |
| 5,918,767 A | 7/1999 | McGill | |
| 6,105,820 A | 8/2000 | McGill | |
| 6,158,621 A | 12/2000 | Keller | |
| 6,182,862 B1 | 2/2001 | McGill | |
| 6,264,066 B1 | 7/2001 | Vincent et al. | |
| 6,290,103 B1 | 9/2001 | Fraillon | |
| 6,431,319 B1 | 8/2002 | Myers et al. | |
| 6,488,180 B1 | 12/2002 | Bayat | |
| 6,520,381 B1 | 2/2003 | Prestele | |
| 6,578,738 B1 | 6/2003 | Keller | |
| 6,604,654 B2 * | 8/2003 | Staten | A23G 9/163 222/1 |
| 6,719,282 B2 | 4/2004 | Frank | |
| 6,722,530 B1 | 4/2004 | King et al. | |
| 6,742,768 B2 | 6/2004 | Alba | |
| RE38,770 E | 8/2005 | Gilbert | |
| 7,111,825 B2 | 9/2006 | Landsberger et al. | |
| 7,163,128 B2 * | 1/2007 | Savage | A23G 9/28 222/1 |
| 7,633,246 B2 | 12/2009 | Bernier et al. | |
| 7,708,169 B1 | 5/2010 | Szoke, Jr. | |
| 7,815,954 B2 | 10/2010 | Miller et al. | |
| 7,861,890 B2 | 1/2011 | McGill | |
| 7,900,425 B2 | 3/2011 | Bysick et al. | |
| 8,220,662 B2 | 7/2012 | Drennow | |
| 8,381,496 B2 | 2/2013 | Trude et al. | |
| 8,381,940 B2 | 2/2013 | Melrose et al. | |
| 2001/0038019 A1 | 11/2001 | Vincent et al. | |
| 2003/0010793 A1 | 1/2003 | Ritsche | |
| 2004/0226968 A1 | 11/2004 | Lafond | |
| 2005/0045427 A1 | 3/2005 | Rennetaud et al. | |
| 2006/0163007 A1 | 7/2006 | Bukowski et al. | |
| 2006/0255066 A1 | 11/2006 | Kannar et al. | |
| 2007/0246484 A1 | 10/2007 | Yoshida et al. | |
| 2008/0023498 A1 | 1/2008 | Bertin et al. | |
| 2008/0149664 A1 | 6/2008 | Schroeder et al. | |
| 2009/0071985 A1 | 3/2009 | Ki | |
| 2009/0120963 A1 | 5/2009 | Bae | |
| 2010/0164264 A1 | 7/2010 | Zadai et al. | |
| 2011/0006273 A1 | 1/2011 | Chen | |
| 2011/0031282 A1 | 2/2011 | Hagen | |
| 2011/0037039 A1 | 2/2011 | Li | |
| 2012/0231410 A1 | 9/2012 | Gramann et al. | |
| 2012/0292341 A1 | 11/2012 | Gramann et al. | |
| 2012/0295215 A1 | 11/2012 | Jelovac et al. | |
| 2012/0313059 A1 | 12/2012 | Litcher | |
| 2013/0037570 A1 | 2/2013 | Broyles et al. | |
| 2013/0105512 A1 * | 5/2013 | McGill | A23G 9/045 222/39 |
| 2014/0138411 A1 * | 5/2014 | Foley | B65D 83/0033 222/386 |
| 2014/0263440 A1 | 9/2014 | Burns | |
| 2014/0374680 A1 | 12/2014 | Tsang | |
| 2015/0223490 A1 | 8/2015 | Cigolini | |

FOREIGN PATENT DOCUMENTS

| | | | |
|---|---|---|---|
| GB | 2230057 A * | 10/1990 | A23G 9/28 |
| JP | 63-263051 | 10/1988 | |
| JP | 64-9587 | 1/1989 | |
| JP | 7-227214 | 8/1995 | |
| JP | 9-9877 | 1/1997 | |
| JP | 2000-355314 | 12/2000 | |
| WO | WO 89/05096 | 6/1989 | |
| WO | WO 00/64770 | 11/2000 | |
| WO | WO 2012007772 A2 * | 1/2012 | |

OTHER PUBLICATIONS

Search Report dated Feb. 10, 2011 issued in Great Britain Patent Application No. 1018311.9, 4 pp.

Search Report dated Jul. 11, 2011 issued in Great Britain Patent Application No. 1104630.7, 6 pp.

U.S. Office Action dated Aug. 12, 2015 issued in U.S. Appl. No. 13/809,732, 18 pp.

U.S. Office Action dated Jan. 13, 2016 issued in U.S. Appl. No. 13/809,732, 18 pp.

* cited by examiner

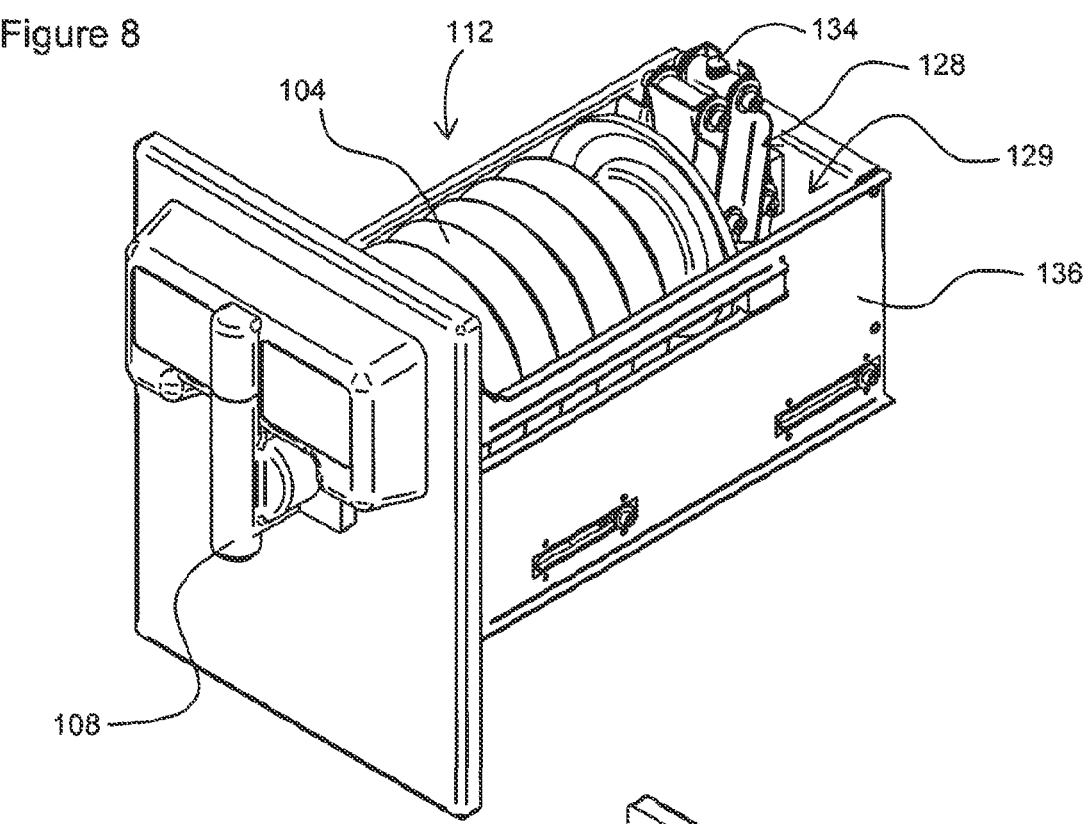
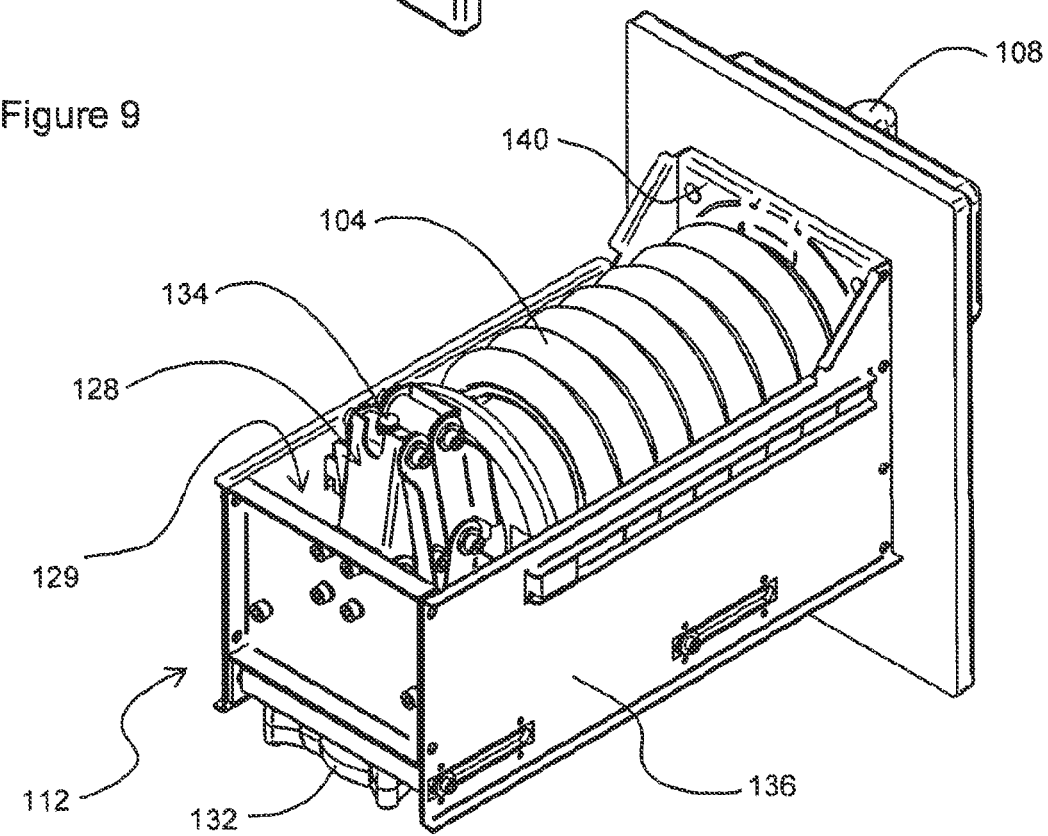

DETAIL A

DISPENSING APPARATUS

CROSS-REFERENCES TO RELATED APPLICATIONS

This application is a divisional of U.S. patent application Ser. No. 13/809,732, filed Jan. 11, 2013, pending, which is the U.S. national phase of International Application No. PCT/GB2011/051348, filed Jul. 18, 2011 which designated the U.S. and claims priority to Great Britain Patent Application No. 1012009.5 filed 16 Jul. 2010, Great Britain Patent Application No. 1018311.9 filed 29 Oct. 2010, Great Britain Patent Application No. 1100978.4 filed 20 Jan. 2011, and Great Britain Patent Application No. 1104630.7 filed 18 Mar. 2011, the entire contents of each of which are hereby incorporated by reference.

STATEMENT REGARDING FEDERALLY SPONSORED RESEARCH OR DEVELOPMENT (Not Applicable)

BACKGROUND OF THE INVENTION

This disclosure relates to dispensing apparatus, more particularly to dispensing apparatus for dispensing food product such as ice cream and other forms of frozen or semi-frozen confection. The disclosure also relates to methods for dispensing food product such as ice cream and other forms of frozen or semi-frozen confection, and containers for use in said apparatus or methods.

It is known to dispense individual portions of ice cream or similar frozen confections (such as sorbet and the like) from a multi-portion container, hereinafter referred to as a "bulk" container. For example, WO 89/05096 describes a dispensing apparatus for expressing individual portions of ice cream through ban outlet in a deformable bulk container of ice cream. In particular, a drive mechanism is operable to drive a dispensing head to compress the container and express product through the outlet.

A problem occurs when trying to accurately control and/or monitor the dispensing of specific portion sizes of product from the container. This problem can be particularly acute when handling frozen or semi frozen product at low temperatures.

BRIEF SUMMARY OF THE INVENTION

The invention overcomes or mitigates one or more of the problems referred to above, and/or one or more other problems associated with known dispensing apparatus for use in dispensing frozen confections, and/or known containers for use in dispensing frozen confections.

One aspect of the present invention provides an apparatus in accordance with claim 1.

In exemplary embodiments, the apparatus includes a refrigerated housing or compartment for the container, for maintaining the container and product therein at desired refrigerated temperature (or range of temperatures), e.g., dependent upon the characteristics and desired state of the product to be dispensed.

In exemplary embodiments, the product is held at a temperature in the range of approximately −18° C. to −20° C. or lower, e.g., for maintaining all water present in the product in a frozen state.

In exemplary embodiments, the container is deformable and comprises of a single piece blow moulding of self-supporting construction, the container having multiple convolutions along its length which are configured to collapse under load against a closed end of the container.

In exemplary embodiments, the container has an outlet through which the product is filled and subsequently dispensed from the container, the outlet having a radially protruding collar with an angled face for sealing engagement in an inlet on said apparatus during the application of load to a closed end of the container in said apparatus.

In exemplary embodiments, the container has first and second ends, the outlet is provided in the first end, concentric with the longitudinal axis of the container, and the container is configured for coaxial collapse upon the application of pressure to the second end in the direction of said first end.

In exemplary embodiments, the apparatus includes a refrigerated housing having a compartment for receiving the container, wherein the compartment includes an inlet for receiving an outlet of the container, and the apparatus is configured to activate the dispensing mechanism for movement to engage an end of the container to hold the outlet of the container in said inlet (e.g., in a non-dispensing state).

According to another aspect of the invention, there is provided a dispensing apparatus for dispensing frozen or semi-frozen confection such as ice cream and sorbet and the like from a collapsible bulk container containing multiple portions of said frozen or semi-frozen confection, the apparatus comprising a refrigerated housing which includes a compartment for receiving a collapsible bulk container containing multiple portions of said frozen or semi-frozen confection, wherein the compartment includes an inlet for receiving an outlet of the container, and a dispensing mechanism is movable within said compartment for movement to engage an end of the container to hold the outlet of the container in said inlet (e.g., in a non-dispensing state), and wherein the apparatus includes an electronic control system for controlling the automation of the dispensing mechanism, to selectively apply a compressive load to the container for dispensing product from the apparatus.

In exemplary embodiments, the apparatus includes a refrigerated housing is configured for maintaining the container and product therein at desired refrigerated temperature (or range of temperatures), e.g. dependent upon the characteristics and desired state of the product to be dispensed. In exemplary embodiments, the product is held at a temperature in the range of approximately −18° C. to −20° C. or lower.

In exemplary embodiments, the container is deformable and comprises of a single piece blow moulding of self-supporting construction, the container having multiple convolutions along its length which are configured to collapse under load against a closed end of the container.

In exemplary embodiments, the container has an outlet through which the product is filled and subsequently dispensed from the container, the outlet having a radially protruding collar with an angled face for sealing engagement in an inlet on said apparatus during the application of load to a closed end of the container in said apparatus, e.g., via said dispensing mechanism.

In exemplary embodiments, the container is arranged in communication with a dispensing nozzle for dispensing product from the apparatus, e.g., into a receptacle such as a cone, tub or cup.

In exemplary embodiments, the container is located on a drawer or cartridge, which is movable within the housing between an extended or open position (e.g., for loading/unloading a container) and a stowed or closed position (e.g., ready for dispensing product from the container). In exemplary embodiments, the cartridge is arranged for sliding movement relative to the housing between the open and closed positions, e.g., on guide rails or another mechanical arrangement between the cartridge and the housing. In exemplary embodiments, movement of the cartridge occurs on a substantially horizontal axis.

In exemplary embodiments, the container is loaded directly into the cartridge, e.g., when the cartridge is in an open position. In exemplary embodiments, the cartridge defines an open topped compartment (e.g., having a base, opposing sides perpendicular to the base, and two ends orthogonal to the sides), so that the container can be loaded into the cartridge from above.

In exemplary embodiments, the dispensing mechanism is arranged for travel with the cartridge. In exemplary embodiments, the dispensing mechanism is mounted on the cartridge, e.g., on an end wall of the compartment. In exemplary embodiments, the cartridge can be removed from the housing, e.g., for cleaning or maintenance. In exemplary embodiments, the housing includes a lock arrangement configured to prevent opening or movement of the cartridge relative to the housing when the dispensing mechanism is operational.

In exemplary embodiments, the housing incorporates multiple cartridges, each configured to receive a container and each having its own dispensing mechanism for expressing product from the container. In exemplary embodiments, the cartridges are arranged side-by-side, e.g., for parallel sliding movement within the housing.

In exemplary embodiments, the dispensing mechanism incorporates a scissor-type linkage which is movable between a retracted position and an extended position, for compressing a container via the dispensing head. In exemplary embodiments, the dispensing head is mounted at one end of the linkage. In exemplary embodiments, the axis of movement of the linkage is generally horizontal and/or parallel with the axis of movement of the cartridge within the housing. In exemplary embodiments, the scissor-type linkage includes at least four linkage members arranged for pivoting movement relative to one another, in order to extend or retract the position of the dispensing head.

In exemplary embodiments, the dispensing mechanism includes a motor for powered rotation of a lead screw. In exemplary embodiments, the lead screw cooperates with the scissor-type linkage, so that rotation of the lead screw in a first direction causes movement of linkage in a first direction and vice versa. In exemplary embodiments, the lead screw is carried by the linkage, and so moves as the linkage moves from its retracted position to its extended position. In exemplary embodiments, the position of the motor changes as the linkage moves from its retracted position to its extended position. In exemplary embodiments, the direction of movement of the motor is parallel with the axis of movement of the linkage.

In exemplary embodiments, the linkage is provided in a frame, which includes a rear plate on which the linkage is mounted and a front plate which includes an aperture through which the neck of the container can be fitted. In exemplary embodiments, the frame is incorporated into said cartridge for mounting in the housing.

In exemplary embodiments, the apparatus includes a dispensing nozzle which includes a valve mechanism having a closed condition (e.g., in which the flow of product is prevented) and an open condition (e.g., in which the flow of product is permitted). In exemplary embodiments, a valve member is movable in a generally vertical tube between a raised open position and a lowered closed position. In exemplary embodiments, the valve mechanism is manually operated, e.g., via a mechanical linkage in communication with valve member. In exemplary embodiments, the valve mechanism is automatically controlled. In exemplary embodiments, operation of the valve mechanism is in response to a command from the control system.

In exemplary embodiments, the dispensing nozzle is manually operable and includes a dispensing handle or lever for manually switching between a closed condition and an open condition, e.g., for controlling the position of a valve member. In exemplary embodiments, the lever is pivotable between a first position in which the valve member is in a closed position and a second position in which the valve member is in an open position. In exemplary embodiments, the handle or lever is arranged to be manually driven from a lower position to an upper position in order to raise the valve member and permit flow through the nozzle. In exemplary embodiments, operation of the dispensing mechanism is automated, e.g., via the motor.

In exemplary embodiments, the control system is arranged in communication with the valve mechanism. In exemplary embodiments, the apparatus includes a manually controlled valve mechanism for selectively permitting/preventing the flow of product from the apparatus (e.g., incorporating a movable valve member of the kind referred to above), and the apparatus is configured so that the dispensing mechanism is activated to apply a compressive load to the container for a dispensing operation upon the valve mechanism being switched from a closed condition to an open condition (e.g., via movement of the handle or lever).

In exemplary embodiments, switching the valve mechanism from the open condition to the closed condition deactivates the motor and thereby interrupts or ends the dispensing operation. In exemplary embodiments, the act of switching between the 'valve closed' and 'valve open' conditions is used to control the motor for a predetermined time period or predetermined operation of the motor or lead screw, in order to automate a specific dispensing operation (e.g., for a desired portion size).

In exemplary embodiments, the control system is programmed to close the valve mechanism at the end of a portion dispensing operation.

In exemplary embodiments, the apparatus is configured for dispensing a range of portion sizes. In exemplary embodiments, the apparatus includes a switch, dial or other adjustable controller, to enable an operator to preset the control system with one or more different portion sizes to be dispensed by operation of the dispensing mechanism In exemplary embodiments, the apparatus includes a control panel or user interface so an operator can activate the dispensing mechanism, e.g., for a fully automated dispensing operation. In exemplary embodiments, the user interface includes multiple selection options, e.g., representative of different dispensing operations, such as to dispense a small, medium and large portion sizes (indicated e.g., by price, size or volume), and/or to provide for continuous dispensing via a free serve option. In exemplary embodiments, the control system is operable in response to a selection or command made via the user interface. In exemplary embodiments, the control system is programmed to control rotation of the lead screw, via the drive motor, in response to the selection or command.

In exemplary embodiments, the drive motor has a rotatable output shaft or other rotatable part, and an encoder, e.g., an optical rotary encoder, is arranged in association with said rotatable shaft/part, to enable the number of revolutions of said shaft/part to be monitored.

In other embodiments, the encoder is arranged in association with the lead screw or any other rotating part between the lead screw and the motor, so that the number of revolutions can be monitored and equated with movement or relative position of the dispensing head.

In exemplary embodiments, the control system is programmed to monitor the pressure inside the container during dispensing operations, e.g., in order to maintain a sufficient pressure for express of product from the container. In exemplary embodiments, a load cell is provided to monitor pressure during a dispensing operation. In exemplary embodiments, the load cell forms part of the dispensing mechanism for detecting reaction forces during the application of load to the container. In exemplary embodiments, the control system is configured to monitor electrical changes during a dispensing operation, e.g., changes in motor current, in order to indicate changes in pressure inside the container.

In exemplary embodiments, the control system is configured to automatically reduce, interrupt or cease operation of the drive motor if the pressure exceeds a threshold value, e.g., indicative that the product is too hard to be expressed. In exemplary embodiments, the load applied by the dispensing head can then be increased after a short time period, e.g., as a check to see whether the product is still too hard to be expressed. If the pressure remains at a 'too hard' level, the motor can be automatically reversed, in order to retract the dispensing head and present the container ready for replacement with another container. The motor may have a higher voltage applied when the dispensing head is being moved in a return direction, e.g., to minimise the time required during changeover of containers.

In exemplary embodiments, the apparatus is configured to apply a compressive load to the container before the control system operates to open the valve mechanism, e.g., to generate a predetermined pressure within the container suitable for expressing the product from the container under normal conditions. In exemplary embodiments, the control system is programmed to hold the dispensing head at that position or pressure for a pre-set time period, e.g., in 'ready to dispense' condition. The dispensing head can be automatically reversed to a 'stand-by' condition (e.g., with a reduced or relieved load on the container) if the control system detects that the dispensing head has been held in 'ready' mode for a pre-set time period without carrying out a dispensing operation. Similarly, the control system may move the dispensing head to a 'ready to dispense' condition after each dispensing operation, followed by automatic retraction to a 'stand-by' condition if the control system detects that the dispensing head has been held in its 'ready to dispense' mode for a pre-set time period without carrying out a further dispensing operation.

In exemplary embodiments, if the pressure data indicates that the pressure inside the container is sufficient to cause product to express from the outlet, the control system reduces or temporarily interrupts operation of the drive motor. It may be desirable to indicate an upper threshold at which point the control system is configured to temporarily deactivate the drive motor. In exemplary embodiments, the control system is configured to re-activate the drive motor when the detected pressure reaches a minimum required value. This process can be repeated as necessary for a desired dispensing operation (e.g., for dispensing a particular portion size as selected by a user of the apparatus), wherein the operation of the motor is regulated to maintain the pressure between said upper and lower thresholds.

In exemplary embodiments, electrical changes indicate the state of pressure within the container, and the motor is controlled to operate at a first speed in order to increase the pressure on the container (for a "ready to dispense" condition) until a predetermined level is reached (e.g., indicated by the current of the motor). In exemplary embodiments, the valve mechanism is then triggered to open, which in turn triggers a second speed for compressing the container and expressing product through its outlet. In exemplary embodiments, the time period for operation at said second speed (which may be lower than the first speed) is preset to desired level relevant for dispensing a specific size of portion under normal operating conditions.

In exemplary embodiments, the dispensing operation of the dispensing apparatus is dependent upon a payment made, e.g., by a token, coin or bank note receiver on the apparatus or by a credit card reader on the apparatus. In exemplary embodiments, activation of the motor or movement of the dispensing head is a function of the amount of payment made.

According to another aspect of the invention, there is provided dispensing apparatus for dispensing frozen or semi-frozen product such as ice cream and sorbet or the like, the dispensing apparatus comprising a bulk container for storing multiple portions of product to be dispensed, wherein the container has an outlet and is of deformable construction, for reducing the internal volume of the container and expressing product through the outlet, a dispensing mechanism for applying pressure to said container to cause frozen or semi-frozen confection to be dispensed from the container through the outlet, and a valve mechanism for controlling the volume of frozen or semi-frozen confection dispensed from the apparatus, wherein dispensing mechanism includes a dispensing head which is movable to apply a load to the container, and wherein the apparatus includes a housing and said container is mounted in a drawer or cartridge which is movable on the housing between an open position for loading or unloading a bulk container and a stowed position for a dispensing operation.

In exemplary embodiments, the cartridge is arranged for sliding movement relative to the housing between the open and closed positions, e.g., on guide rails or another mechanical arrangement between the cartridge and the housing. In exemplary embodiments, movement of the cartridge occurs on a substantially horizontal axis. In exemplary embodiments, the container is loaded directly into the cartridge, e.g., when the cartridge is in an open position. In exemplary embodiments, the cartridge defines an open topped compartment (e.g., having a base, opposing sides perpendicular to the base, and two ends orthogonal to the sides), so that the container can be loaded into the cartridge from above. In exemplary embodiments, the dispensing mechanism is arranged for travel with the cartridge. In exemplary embodiments, the dispensing mechanism is mounted on the cartridge, e.g., on an end wall of the compartment. In exemplary embodiments, the cartridge can be removed from the housing, e.g., for cleaning or maintenance. In exemplary embodiments, the housing includes a lock arrangement configured to prevent opening or movement of the cartridge relative to the housing when the dispensing mechanism is operational.

In exemplary embodiments, the housing incorporates multiple cartridges, each configured to receive a container and each having its own dispensing mechanism for expressing product from the container. In exemplary embodiments, the cartridges are arranged side-by-side, e.g., for parallel sliding movement within the housing.

In exemplary embodiments, the dispensing mechanism incorporates a scissor-type linkage which is movable between a retracted position and an extended position, for compressing a container via the dispensing head. In exemplary embodiments, the dispensing head is mounted at one end of the linkage. In exemplary embodiments, the axis of movement of the linkage is generally horizontal and/or parallel with the axis of movement of the cartridge within the housing. In exemplary embodiments, the scissor-type linkage includes at least four linkage members arranged for pivoting movement relative to one another, in order to extend or retract the position of the dispensing head.

In exemplary embodiments, the dispensing mechanism includes a motor for powered rotation of a lead screw. In exemplary embodiments, the lead screw cooperates with the scissor-type linkage, so that rotation of the lead screw in a first direction causes movement of linkage in a first direction and vice versa. In exemplary embodiments, the lead screw is carried by the linkage, and so moves as the linkage moves from its retracted position to its extended position. In exemplary embodiments, the position of the motor changes as the linkage moves from its retracted position to its extended position. In exemplary embodiments, the direction of movement of the motor is parallel with the axis of movement of the linkage.

In exemplary embodiments, the linkage is provided in a frame, which includes a rear plate on which the linkage is mounted and a front plate which includes an aperture through which the neck of the container can be fitted. In exemplary embodiments, the frame is incorporated into said cartridge for mounting in the housing.

In exemplary embodiments, the apparatus includes a dispensing nozzle which includes a valve mechanism having a closed condition (e.g., in which the flow of product is prevented) and an open condition (e.g., in which the flow of product is permitted). In exemplary embodiments, the valve mechanism is manually operated, e.g., via a mechanical linkage in communication with valve member. In exemplary embodiments, the valve mechanism is automatically controlled. In exemplary embodiments, operation of the valve mechanism is in response to a command from the control system. In exemplary embodiments, the control system is programmed to close the valve mechanism at the end of a portion dispensing operation.

In exemplary embodiments, the apparatus includes a control system operable to control operation of the dispensing head, for dispensing individual portions of product from the container via the dispensing mechanism.

In exemplary embodiments, the apparatus includes a motor having a rotatable output, wherein rotation of the output in a first direction causes movement of the dispensing head in a dispensing direction for applying a load to the container, and wherein the control system is programmed to dispense a predefined portion size of product from the bulk container on demand, corresponding to a number of revolutions of the rotatable output of the motor.

In exemplary embodiments, the dispensing operation of the dispensing apparatus is dependent upon a payment made, e.g., by a token, coin or bank note receiver on the apparatus or by a credit card reader on the apparatus. In exemplary embodiments, activation of the motor or movement of the dispensing head is a function of the amount of payment made.

In exemplary embodiments, the container is deformable and comprises of a single piece blow moulding of self-supporting construction, the container having multiple convolutions along its length which are configured to collapse under load against a closed end of the container.

In exemplary embodiments, the container has an outlet through which the product is filled and subsequently dispensed from the container, the outlet having a radially protruding collar with an angled face for sealing engagement in an inlet on said apparatus during the application of load to a closed end of the container in said apparatus.

In exemplary embodiments, the container has first and second ends, the outlet is provided in the first end, concentric with the longitudinal axis of the container, and the container is configured for coaxial collapse upon the application of pressure to the second end in the direction of said first end.

In exemplary embodiments, the apparatus includes a refrigerated housing having a compartment for receiving the container, wherein the compartment includes an inlet for receiving an outlet of the container, and the apparatus is configured to activate the dispensing mechanism for movement to engage an end of the container to hold the outlet of the container in said inlet (e.g., in a non-dispensing state).

According to another aspect of the invention, there is provided a method of dispensing a frozen or semi frozen confection or dessert such as ice cream, the method including the steps of pre-packing frozen confection in a container at a remote location, shipping the pre-packed container to a dispensing location, mounting the container in a dispensing apparatus, wherein the container is stored at a temperature in the region of at least −18° C. to −20° C. or lower whilst inside the dispensing apparatus in order to prevent degradation of the product in the container, using the dispensing apparatus to carry out a dispensing operation on demand, whereby product is extruded from the container by the application of pressure to the container, so that product is discharged through a discharge nozzle in communication with the container, wherein the dispensing apparatus includes a dispensing head arranged for deforming the container and expressing product through the outlet, and a control system for controlling operation of the dispensing head, for dispensing individual portions of product from the container, and wherein the method includes the step of using the control system to dispense a predefined portion size of product from the bulk container on demand, wherein a user selects a desired portion size to be dispensed and the control system operates an automatic dispensing system configured to dispense a disposable container for receiving expressed product from the bulk container via the nozzle.

In exemplary embodiments, the disposable container is automatically presented on a seating beneath the nozzle ready to receive the selected portion size. In exemplary embodiments, the dispensing system selects the size of disposable container from two or more available sizes, dependent upon the size of the portion selected by the user. In exemplary embodiments, the dispensing operation of the dispensing apparatus is dependent upon a payment made, e.g., by a token, coin or bank note receiver on the apparatus or by a credit card reader on the apparatus. In exemplary embodiments, activation of the motor or movement of the dispensing head is a function of the amount of payment made.

According to another aspect of the invention, there is provided a dispensing apparatus for dispensing frozen or semi-frozen product such as ice cream or sorbet or the like, wherein the dispensing apparatus is of the kind comprising a bulk container for storing multiple portions of product to be dispensed, wherein the container has an outlet and is of deformable construction, for reducing the internal volume of the container and expressing product through the outlet, a dispensing mechanism including a dispensing head which is movable to apply pressure to said container to cause product to be expressed from the container through the outlet, and a valve mechanism for controlling the flow of product from the apparatus, and wherein the dispensing mechanism further includes a rotatable lead screw arrangement wherein rotation of a lead screw in a first direction causes movement of the dispensing head in a dispensing direction and rotation of the lead screw in a second direction causes movement of the dispensing head in a return direction, wherein the dispensing mechanism includes a motor for operation of the lead screw and wherein the relative position of the motor moves during operation of the lead screw.

In exemplary embodiments, the lead screw is orthogonal with the axis of movement of the dispensing head or with an axis of collapse of the container under load from the dispensing head.

In exemplary embodiments, the container has an axis of collapse under load from the dispensing head, and wherein said axis is arranged horizontally in the apparatus.

In exemplary embodiments, the apparatus includes a housing and the container is mounted in a drawer or cartridge which is movable in said housing between an open position for loading or unloading a multi portion container and a stowed position for a dispensing operation.

In exemplary embodiments, the drawer or cartridge is movable along a horizontal axis or an axis which is parallel with an axis of collapse of the container or an axis of movement of the dispensing head. In exemplary embodiments, the dispensing mechanism is carried on the movable drawer or cartridge. In exemplary embodiments, the axis of movement of the motor is parallel with an axis of collapse of the container or an axis of movement of the dispensing head.

In exemplary embodiments, the lead screw is arranged to operate an expandable scissor linkage for driving the dispensing head in a dispensing direction. In exemplary embodiments, the motor is carried by said scissor linkage. In exemplary embodiments, the dispensing head is connected to the scissor linkage.

In exemplary embodiments, the cartridge is arranged for sliding movement relative to the housing between the open and closed positions, e.g., on guide rails or another mechanical arrangement between the cartridge and the housing. In exemplary embodiments, movement of the cartridge occurs on a substantially horizontal axis.

In exemplary embodiments, the container is loaded directly into the cartridge, e.g., when the cartridge is in an open position. In exemplary embodiments, the cartridge defines an open topped compartment (e.g., having a base, opposing sides perpendicular to the base, and two ends orthogonal to the sides), so that the container can be loaded into the cartridge from above.

In exemplary embodiments, the dispensing mechanism is arranged for travel with the cartridge. In exemplary embodiments, the dispensing mechanism is mounted on the cartridge, e.g., on an end wall of the compartment. In exemplary embodiments, the cartridge can be removed from the housing, e.g., for cleaning or maintenance. In exemplary embodiments, the housing includes a lock arrangement configured to prevent opening or movement of the cartridge relative to the housing when the dispensing mechanism is operational.

In exemplary embodiments, the housing incorporates multiple cartridges, each configured to receive a container and each having its own dispensing mechanism for expressing product from the container. In exemplary embodiments, the cartridges are arranged side-by-side, e.g., for parallel sliding movement within the housing.

In exemplary embodiments, the dispensing mechanism incorporates a scissor-type linkage which is movable between a retracted position and an extended position, for compressing a container via the dispensing head. In exemplary embodiments, the dispensing head is mounted at one end of the linkage. In exemplary embodiments, the axis of movement of the linkage is generally horizontal and/or parallel with the axis of movement of the cartridge within the housing. In exemplary embodiments, the scissor-type linkage includes at least four linkage members arranged for pivoting movement relative to one another, in order to extend or retract the position of the dispensing head.

In exemplary embodiments, the linkage is provided in a frame, which includes a rear plate on which the linkage is mounted and a front plate which includes an aperture through which the neck of the container can be fitted. In exemplary embodiments, the frame is incorporated into said cartridge for mounting in the housing.

In exemplary embodiments, the apparatus includes a dispensing nozzle which includes a valve mechanism having a closed condition (e.g., in which the flow of product is prevented) and an open condition (e.g., in which the flow of product is permitted). In exemplary embodiments, the valve mechanism is manually operated, e.g., via a mechanical linkage in communication with valve member. In exemplary embodiments, the valve mechanism is automatically controlled. In exemplary embodiments, operation of the valve mechanism is in response to a command from the control system. In exemplary embodiments, the control system is programmed to close the valve mechanism at the end of a portion dispensing operation.

In exemplary embodiments, the apparatus includes a refrigerated housing or compartment for the container, for maintaining the container and product therein at desired refrigerated temperature (or range of temperatures), e.g., dependent upon the characteristics and desired state of the product to be dispensed. In exemplary embodiments, the product is held at a temperature in the range of approximately −18° C. to −20° C. or lower, e.g., for maintaining all water present in the product in a frozen state.

In exemplary embodiments, the container is deformable and comprises of a single piece blow moulding of self-supporting construction, the container having multiple convolutions along its length which are configured to collapse under load against a closed end of the container.

In exemplary embodiments, the container has an outlet through which the product is filled and subsequently dispensed from the container, the outlet having a radially protruding collar with an angled face for sealing engagement in an inlet on said apparatus during the application of load to a closed end of the container in said apparatus.

In exemplary embodiments, the container has first and second ends, the outlet is provided in the first end, concentric with the longitudinal axis of the container, and the container is configured for coaxial collapse upon the application of pressure to the second end in the direction of said first end.

In exemplary embodiments, the apparatus includes a refrigerated housing having a compartment for receiving the container, wherein the compartment includes an inlet for receiving an outlet of the container, and the apparatus is configured to activate the dispensing mechanism for movement to engage an end of the container to hold the outlet of the container in said inlet (e.g., in a non-dispensing state).

According to another aspect of the invention, there is provided a dispensing apparatus for dispensing frozen or semi-frozen product such as ice cream or sorbet or the like, wherein the dispensing apparatus is of the kind comprising a bulk container for storing multiple portions of product to be dispensed, wherein the container has an outlet and is of deformable construction, for reducing the internal volume of the container and expressing product through the outlet, a dispensing mechanism including a dispensing head which is movable to apply pressure to said container to cause product to be expressed from the container through the outlet, and a valve mechanism for controlling the flow of product from the apparatus, and wherein the dispensing mechanism further includes a rotatable lead screw arrangement wherein rotation of a lead screw in a first direction causes movement of the dispensing head in a dispensing direction and rotation of the lead screw in a second direction causes movement of the dispensing head in a return direction, wherein the lead screw is arranged to operate an expandable scissor linkage for driving the dispensing head in a dispensing direction.

In exemplary embodiments, the dispensing mechanism includes a motor, which is carried by said scissor linkage. In exemplary embodiments, the dispensing head is connected to the scissor linkage.

In exemplary embodiments, the dispensing mechanism includes a motor for operation of the lead screw and wherein the relative position of the motor moves during operation of the lead screw. In exemplary embodiments, the lead screw is orthogonal with the axis of movement of the dispensing head or with an axis of collapse of the container under load from the dispensing head.

In exemplary embodiments, the container has an axis of collapse under load from the dispensing head, and wherein said axis is arranged horizontally in the apparatus.

In exemplary embodiments, the apparatus includes a housing and the container is mounted in a drawer or cartridge which is movable in said housing between an open position for loading or unloading a multi portion container and a stowed position for a dispensing operation.

In exemplary embodiments, the drawer or cartridge is movable along a horizontal axis or an axis which is parallel with an axis of collapse of the container or an axis of movement of the dispensing head. In exemplary embodiments, the dispensing mechanism is carried on the movable drawer or cartridge. In exemplary embodiments, the axis of movement of the motor is parallel with an axis of collapse of the container or an axis of movement of the dispensing head.

In exemplary embodiments, the container is loaded directly into the cartridge, e.g., when the cartridge is in an open position. In exemplary embodiments, the cartridge defines an open topped compartment (e.g., having a base, opposing sides perpendicular to the base, and two ends orthogonal to the sides), so that the container can be loaded into the cartridge from above.

In exemplary embodiments, the cartridge can be removed from the housing, e.g., for cleaning or maintenance. In exemplary embodiments, the housing includes a lock arrangement configured to prevent opening or movement of the cartridge relative to the housing when the dispensing mechanism is operational.

In exemplary embodiments, the housing incorporates multiple cartridges, each configured to receive a container and each having its own dispensing mechanism for expressing product from the container. In exemplary embodiments, the cartridges are arranged side-by-side, e.g., for parallel sliding movement within the housing.

In exemplary embodiments, the linkage is provided in a frame, which includes a rear plate on which the linkage is mounted and a front plate which includes an aperture through which the neck of the container can be fitted. In exemplary embodiments, the frame is incorporated into said cartridge for mounting in the housing.

In exemplary embodiments, the apparatus includes a dispensing nozzle which includes a valve mechanism having a closed condition (e.g., in which the flow of product is prevented) and an open condition (e.g., in which the flow of product is permitted). In exemplary embodiments, the valve mechanism is manually operated, e.g., via a mechanical linkage in communication with valve member. In exemplary embodiments, the valve mechanism is automatically controlled. In exemplary embodiments, operation of the valve mechanism is in response to a command from the control system. In exemplary embodiments, the control system is programmed to close the valve mechanism at the end of a portion dispensing operation.

In exemplary embodiments, the apparatus includes a control system operable to control operation of the dispensing head, for dispensing individual portions of product from the container via the dispensing mechanism.

In exemplary embodiments, the apparatus includes a motor having a rotatable output, wherein rotation of the output in a first direction causes movement of the dispensing head in a dispensing direction for applying a load to the container, and wherein the control system is programmed to dispense a predefined portion size of product from the bulk container on demand, corresponding to a number of revolutions of the rotatable output of the motor.

In exemplary embodiments, the dispensing operation of the dispensing apparatus is dependent upon a payment made, e.g., by a token, coin or bank note receiver on the apparatus or by a credit card reader on the apparatus. In exemplary embodiments, activation of the motor or movement of the dispensing head is a function of the amount of payment made.

In exemplary embodiments, the apparatus includes a refrigerated housing is configured for maintaining the container and product therein at desired refrigerated temperature (or range of temperatures), e.g., dependent upon the characteristics and desired state of the product to be dispensed. In exemplary embodiments, the product is held at a temperature in the range of approximately −18° C. to −20° C. or lower.

In exemplary embodiments, the container is deformable and comprises of a single piece blow moulding of self-supporting construction, the container having multiple convolutions along its length which are configured to collapse under load against a closed end of the container.

In exemplary embodiments, the container has an outlet through which the product is filled and subsequently dispensed from the container, the outlet having a radially protruding collar with an angled face for sealing engagement in an inlet on said apparatus during the application of load to a closed end of the container in said apparatus, e.g., via said dispensing mechanism.

In exemplary embodiments, the container is arranged in communication with a dispensing nozzle for dispensing product, e.g., into a receptacle such as a cone, tub or cup.

According to another aspect of the invention, there is provided a container for use in the above aspects of the invention wherein the container is deformable and comprises of a single piece blow moulding of self-supporting construction, the container having multiple convolutions along its length which are configured to collapse under load against a closed end of the container, and an outlet through which the product is filled and subsequently dispensed from the container, the outlet having a radially protruding collar with an angled face for sealing engagement in an inlet on said apparatus during the application of load to a closed end of the container in said apparatus.

BRIEF DESCRIPTION OF THE DRAWINGS

Other aspects and features of the invention will be apparent from the claims and the following description of exemplary embodiments, made by way of example only, with reference to the accompanying drawings, in which:

FIG. 8 is a schematic perspective view from the front of a loaded cartridge for use in the apparatus of FIG. 1;

FIG. 9 is a schematic perspective view from the rear of the loaded cartridge of FIG. 8;

DETAILED DESCRIPTION OF THE INVENTION

Figure 1:
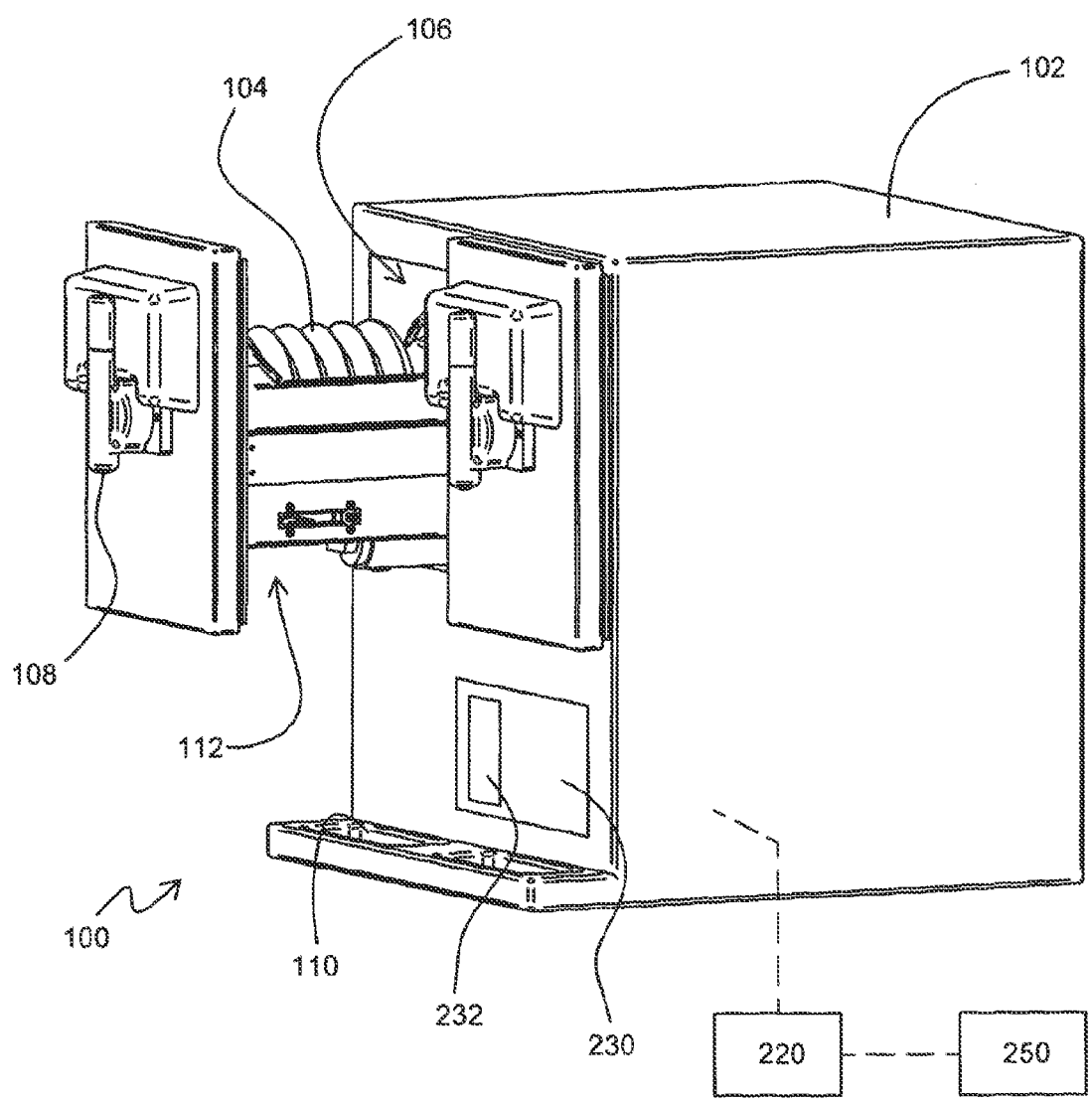
FIG. 1 is a schematic perspective view of a twin cartridge dispensing apparatus.

Referring firstly to FIG. 1, an apparatus for dispensing food product, more particularly frozen or semi-frozen confections such as ice cream or sorbet and the like, is indicated generally at 100.

The apparatus 100 consists of a housing 102 in which a container 104 of product to be dispensed can be removably located. As described in more detail below, the apparatus 100 includes a dispensing mechanism 106, only part of which is illustrated in FIG. 1. The dispensing mechanism 106 is provided for compressing the container 104, in order to express food product from the container 104. The container 104 is arranged in communication with a dispensing nozzle 108. Product from the container 104 is expressed into a receptacle, e.g., a cone or cup, through the dispensing nozzle 108. In this embodiment, the dispensing nozzle 108 is provided on the housing 102. The housing 102 further includes a drip tray 110, which is positioned below the dispensing nozzle 108.

In the embodiment of FIG. 1, the container 104 is located on a drawer or cartridge 112, which is movable within the housing 102 between an extended or open position (e.g., for loading/unloading a container 104) and a stowed or closed position (e.g., ready for dispensing product from the container 104). In exemplary embodiments, the cartridge 112 is arranged for sliding movement relative to the housing 102 between the open and closed positions, e.g., on guide rails or another mechanical arrangement between the cartridge 112 and the housing 102. In the illustrated embodiment, movement of the cartridge 112 occurs on a substantially horizontal axis.

In the illustrated embodiment, the container 104 is loaded directly into the cartridge 112, e.g., when the cartridge 112 is in an open position. More particularly, the cartridge 112 defines an open topped compartment (e.g., having a base, opposing sides perpendicular to the base, and two ends orthogonal to the sides). Hence, the container 104 can be loaded into the cartridge 112 from above, i.e. through the open top of the compartment, when the cartridge 112 is in a suitably open position relative to the housing 102.

In exemplary embodiments, the dispensing mechanism 106 is arranged for travel with the cartridge 112. In the illustrated embodiment, the dispensing mechanism 106 is mounted on the cartridge 112, more particularly on an end wall of the compartment. Advantageously, the cartridge 112 can be removed from the housing 102, e.g., for cleaning or maintenance, wherein the dispensing mechanism 106 is removed from the housing with the cartridge 112.

The housing 102 includes a lock arrangement (not shown) configured to prevent opening or movement of the cartridge 112 relative to the housing 102 when the dispensing mechanism 106 is operational.

The housing 102 is, in effect, a refrigerated cabinet, for keeping the container 104 and product therein at a refrigerated temperature. The specific temperature (or range of temperatures) will be dependent upon the characteristics and desired dispensed state of the product. In exemplary embodiments, the product is held at a temperature in the range of approximately −18° C. to −20° C. or lower. In such embodiments, the intention is to ensure that all water present in the product remains frozen, thereby ensuring optimum shelf life for the product inside the container 104. It will be understood that the presence or appearance of unfrozen water within the product in the container 104 may cause the product to degrade at a more rapid pace (e.g., as a result of re-freezing effects) than if all of the water remains frozen at all times within the housing 102.

In exemplary embodiments, the housing 102 includes a refrigeration unit (not shown), which may be of any form suitable for maintaining the frozen confection, such as ice cream or sorbet, at the desired storage temperature. In exemplary embodiments, the container 104 is wholly enclosed in the refrigerated housing 102.

In exemplary embodiments, the apparatus 100 is configured to provide close cooperation between the housing 102 and the cartridge 112, particularly between any moving parts, areas of physical abutment, in order to reduce or eliminate areas for the build up of ice. This may include the use of a magnetic closure between the housing 102 and the cartridge 112 (i.e. for the stowed position) and may include heater tape or the like where appropriate, as in conventional freezer cabinets, in particular on the sliding parts and on areas of abutment between the cartridge 112 and the housing 102.

In the embodiment of FIG. 1, the housing 102 is configured for receiving multiple containers 104. More particularly, the housing 102 incorporates multiple cartridges 112, each configured to receive a container 104 and each having its own dispensing mechanism 106 for expressing product from the container. This can enable the apparatus 100 to be used for dispensing different flavours and/or types of frozen or semi-frozen product. In the embodiment of FIG. 1, the cartridges 112 are arranged side-by-side and arranged for parallel sliding movement within the housing 102. However, in other embodiments the multiple cartridges 112 may be arranged differently, e.g., one above another with in-line or off-set nozzles 108 and a single drip tray 110.

Although the illustrated apparatus 100 is configured for dispensing from two containers 104 (e.g., simultaneously), other embodiments may be configured for housing only a single container 104, or three or more containers 104.

In exemplary embodiments, the containers 104 for use in the apparatus 100 take the form of a bulk source of product, e.g., containing multiple portions of food product prior to a first dispensing operation.

Figure 2:
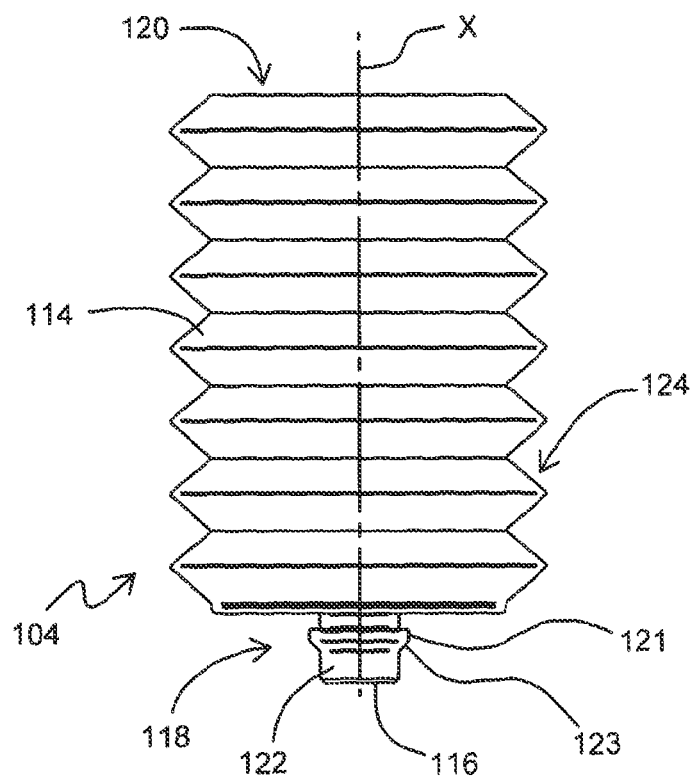
FIG. 2 is a schematic side view of a container for use in the apparatus of FIG. 1.

An example of a suitable container 104 is shown in FIG. 2. The container 104 has a body 114 of generally cylindrical form. The body 114 is generally circular in plan view and defines a central longitudinal axis X, extending left to right as viewed in FIG. 2.

The container 104 has an outlet 116 at a first end 118 of the body 114. In this embodiment, the outlet 116 is aligned with the central longitudinal axis X of the container 104. In this embodiment, the opposite end 120 of the body 114 is closed. Hence, the container 104 is intended to be filled with product through the outlet 116. This means that, once filled, the outlet 116 is the only place from which product may be expressed or accessed from the container 104, without breaking into the body 114.

The outlet 116 defines a neck 122 configured for connection to a closure cap (not shown), e.g., for storage purposes. The neck 122 is also configured for connection with the dispensing nozzle 108 on the apparatus 100. To that extent, the neck 122 includes radially protruding collar 121 with an angled face 123 for sealing engagement in an inlet on the dispensing apparatus 100 during the application of load to a closed end of the container 104 (e.g., as will be described in more detail below).

The container 104 is intended to be at least partially pre-filled with ice cream or other frozen or semi-frozen confection, e.g., through the outlet 116. In exemplary embodiments, the filling operation takes place at a packing location remote from the dispensing location. The at least partially filled container 104 will typically be stored and transported to the dispensing location under chilled or freezing conditions (as necessary to maintain the product in a desired state).

The container 104 is of collapsible form, to enable the internal volume of the container 104 to be reduced in order to express product through the outlet 116. More particularly, the body 114 is configured for coaxial collapse along the central longitudinal axis X of the body 114 in the direction of the outlet 116.

In the illustrated embodiment, the body 114 is of a generally concertina-like form, defining a plurality of convolutions or concertina sections 124, which are configured to collapse when the closed end 120 of the container 104 is moved in the direction of the outlet 116 (e.g., as product is expressed from the outlet 116).

Figure 3:
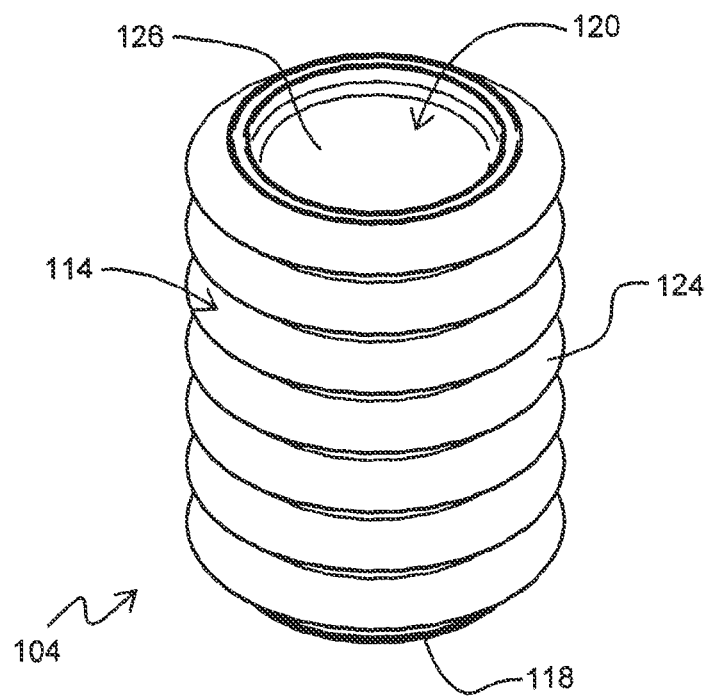
FIG. 3 is a schematic perspective view of the container of FIG. 2.

As shown in FIG. 3, the closed end 120 of the container 104 includes a recess 126 for locating a plunger or other dispensing head (not shown) intended for engaging the closed end 120 of the container 104 and for compressing the container 104 along the central longitudinal axis X (e.g., as will be described in more detail below).

In exemplary embodiments, the end surface of the dispensing head (i.e. the part which engages the container in use) may be configured to fit over the closed end 120 of the container (e.g., so that the recess 126 may be omitted), and/or may define an annular recess for accommodating the periphery of the container 104 when the container 104 is in its fully compressed state.

In exemplary embodiments, the container 104 is of blow-moulded construction. The side walls of the container 104 may be of self-supporting construction, i.e. so that the container 104 maintains a configuration at least substantially as shown in FIG. 2 prior to filling or compression. In exemplary embodiments, the container 104 is blow moulded and then compressed and held in a compressed state, prior to filling (e.g., in order to reduce shipping volumes). In other embodiments, the container 104 may have a normally collapsed state, prior to filling.

A dispensing mechanism 106 for use with the housing 102 and the container 104 will now be described with reference to FIGS. 4 to 7.

The dispensing mechanism 106 includes a dispensing head 146 which is configured for engagement with the closed end of the container, for compressing the container 104 along the axis X. A front face 148 of the dispensing head 146 includes a projection 150 (see FIG. 4) configured to nest within the recess 126 in the closed end 120 of the container 104, to ensure correct location of the dispensing head 146 relative to the container 104 prior to operation of the dispensing mechanism 106.

Figure 4:
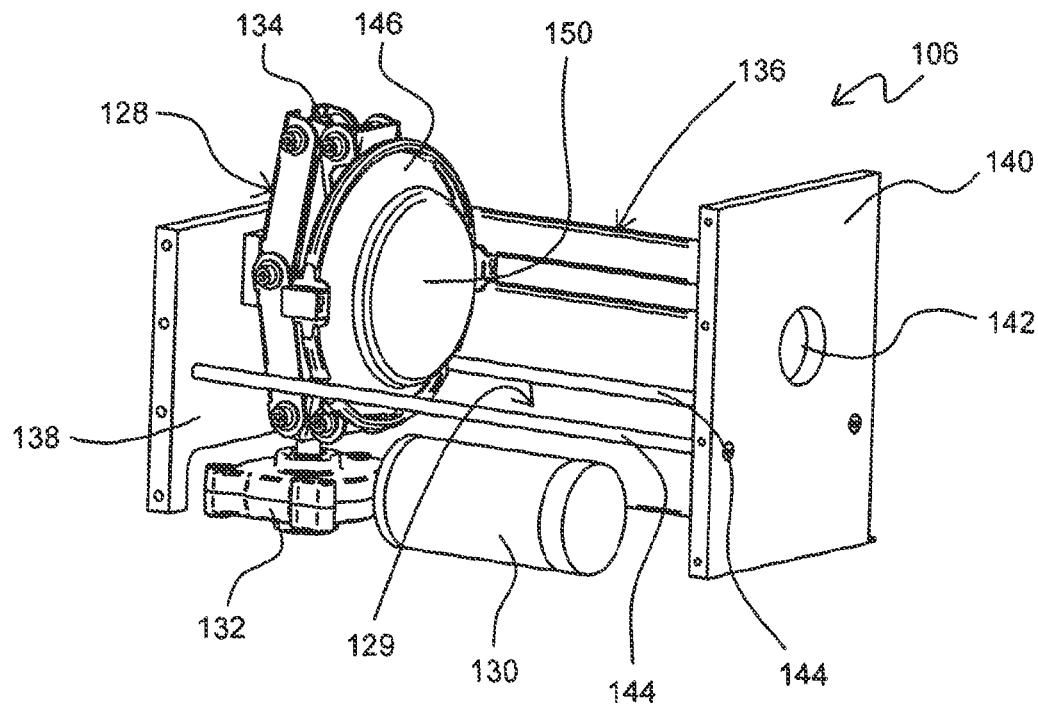
FIG. 4 is a schematic perspective view of a dispensing mechanism for use in the apparatus of FIG. 1, in a retracted position.
Figure 6:
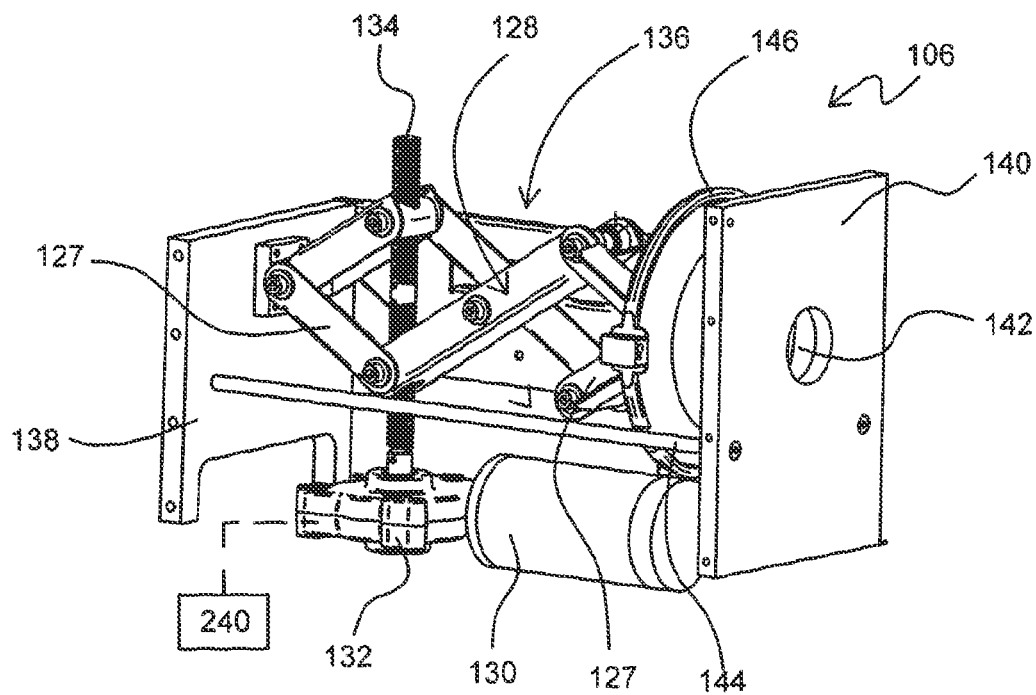
FIG. 6 is a schematic perspective view of a dispensing mechanism for use in the apparatus of FIG. 1, in an extended position.

The dispensing mechanism 106 of this embodiment incorporates a scissor-type linkage 128 which is movable between a retracted position (e.g., as illustrated in FIG. 4) and an extended position (e.g., as illustrated in FIG. 6), for compressing a container 104 via the dispensing head 146. More particularly, the dispensing head 146 is mounted at one end of the linkage 128.

In this embodiment, the axis of movement of the linkage is generally horizontal (e.g., parallel with the axis of movement of the cartridge 112 within the housing 102).

In exemplary embodiments, the scissor-type linkage 128 includes at least four linkage members 127, which are arranged for pivoting movement relative to one another, in order to extend or retract the position of the dispensing head 146. In the embodiment of FIGS. 4 to 7, the scissor-type linkage 128 includes six linkage members 127.

The dispensing mechanism 106 includes a motor 130 and a gearbox 132, which are arranged for powered rotation of a lead screw 134. The lead screw 134 cooperates with the scissor-type linkage 128 in a mechanical manner, so that rotation of the lead screw 134 in a first direction (e.g., clock-wise) causes movement of linkage 128 in a first direction (e.g., from a retracted position to an extended position, and vice versa. Hence, exemplary embodiments of lead screw 134 have right- and left-hand threads for operation of the scissor mechanism 128 in two (opposite) directions.

Figure 5:
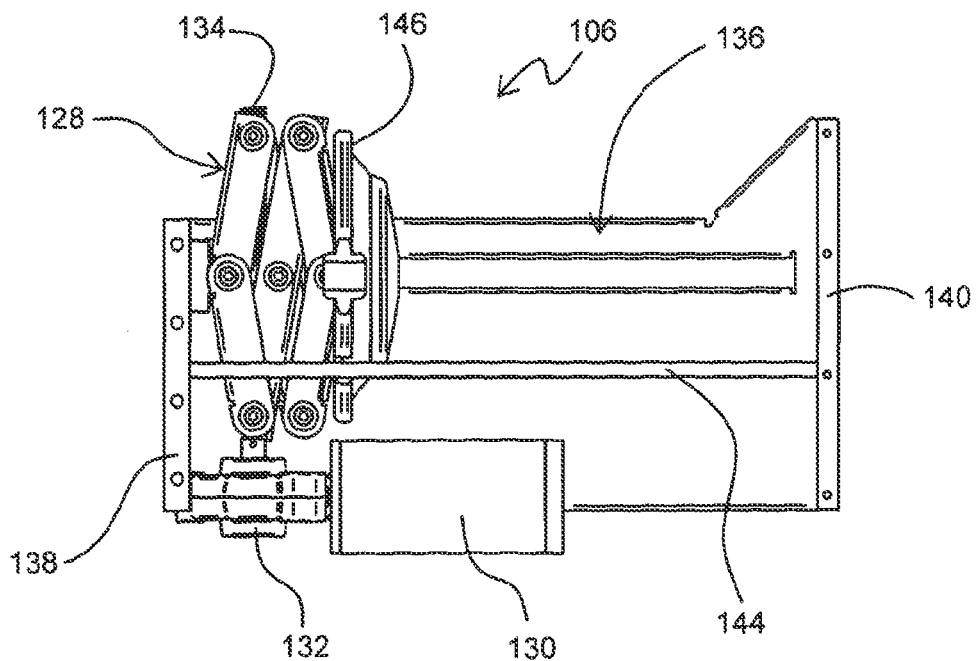
FIG. 5 is a schematic side view of the dispensing mechanism of FIG. 4.
Figure 7:
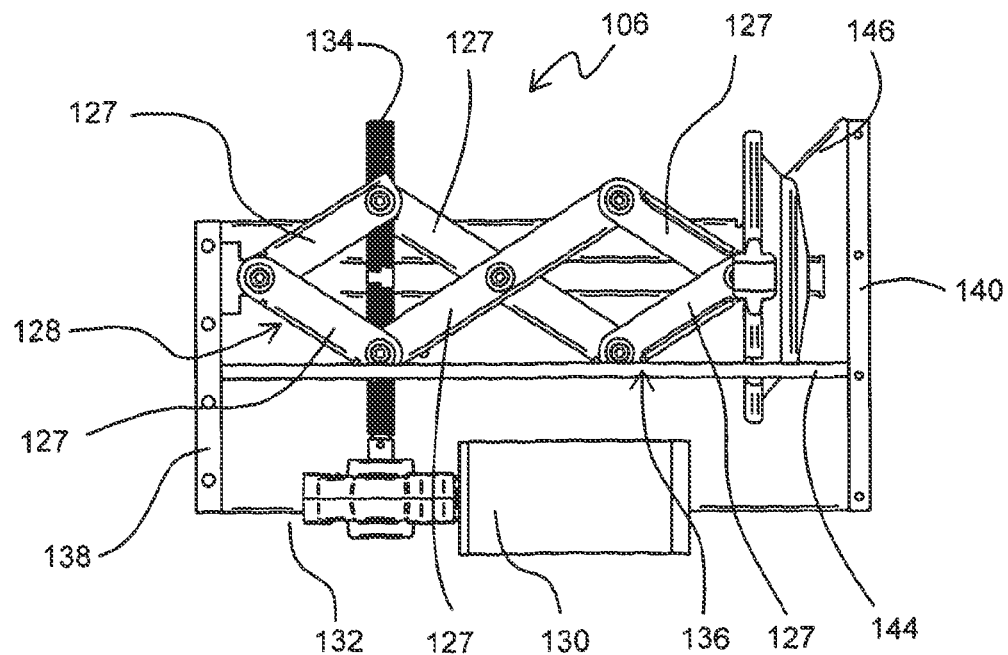
FIG. 7 is a schematic side view of the dispensing mechanism of FIG. 6.

The lead screw 134 is carried by the linkage 128, and so moves from left to right as viewed in FIGS. 5 and 7, e.g., as the linkage 128 moves from its retracted position to its extended position. As a result, the position of the motor 130 and gearbox 132 changes as the linkage 128 moves from its retracted position to its extended position. In the embodiment of FIGS. 4 to 7, the direction of movement of the motor 130 and gearbox 132 is parallel with the axis of movement of the linkage 128.

The linkage 128 is provided in a frame 136 which can be incorporated into a cartridge 112 for mounting in the housing 102. The frame 136 includes a rear plate 138 on which the linkage 128 is mounted and a front plate 140 which includes an aperture 142 through which the neck 122 of the container 104 can be fitted. Support elements 144 are provided between the front and rear plates 138, 140, to reinforce and strengthen the frame 136 against twisting forces during operation of the dispensing mechanism 106.

It will be understood that the cartridge 112 defines an open-topped compartment 129 for receiving the container 100. The compartment 129 has front and rear pressure plates 140, 138 which are fixed relative to one another, e.g., by side plates 136 and tie bars 144. and the dispensing mechanism 106 is carried on the compartment. Hence, operating pressures during a dispensing operation will be substantially restricted to the confines of the cartridge 112.

FIGS. 8 and 9 show the dispensing mechanism 106 of FIGS. 4 to 7 incorporated into the cartridge 112 of FIG. 1. As can be seen, a container 104 has been fitted into the cartridge 112, i.e. with the neck 122 of the container 104 arranged through the aperture 144 in the front plate 140 of the frame 136, and with the dispensing head 146 located for nested engagement with the closed end 120 of the container 104. The dispensing mechanism 106 can then be operated to compress the container 104 along the axis of collapse X, so as to express a volume of product from the container 104, i.e. through the outlet 116 of the container 104.

In other embodiments (not shown), the dispensing mechanism 106 may include an actuator (e.g., a linear actuator) having an output which is arranged to move from a first position to second position (e.g., from a retracted position to an extended position) for driving the dispensing head 146 in a container deforming direction. For example, the lead screw and scissor mechanism may be replaced by a linear actuator arranged behind the dispensing head 146, with an output arranged to move in a direction concentric with the axis of collapse X of the container 104, e.g., in a generally horizontal direction, for deforming and collapsing the container 104 in the direction of the front plate 138. The axis of movement of the output may be concentric with the axis of movement of the plunger and/or the desired axis of collapse of the container. The linear actuator may be motor driven. In exemplary embodiments, the linear actuator is mounted on the cartridge 112.

However, the use of the scissor-type linkage 128 and lead screw 134 has multiple advantages. For example, it allows for a large movement in the dispensing direction in response to a comparatively small movement (in terms of rotational travel) of the lead screw. It facilitates a very compact arrangement, in which the height and depth of the apparatus can be minimised, rendering the apparatus suitable for a wide variety of retail environments (e.g., for use on standard counters worldwide. The provision of the motor 130 underneath the scissor linkage 128 further adds to the compact dimensions of the dispensing mechanism 106. Moreover, the use of a horizontal axis for dispensing operations renders the dispensing mechanism 106 readily suitable for use in a compact cartridge system of the kind shown in FIG. 1. This also overcomes health and safety issues concerning lifting of heavy apparatus. The refrigerated housing 102 can be moved independently of the cartridges 112 and dispensing mechanism 106. After sales service also becomes non-specialist. For example, a fault can be analysed and replacement components can be shipped and easily installed, minimising downtime. Replacement cartridges 112 can be stored for use in such situations.

As mentioned above, product from the container 104 is expressed through a dispensing nozzle 108. An exemplary embodiment of a dispensing nozzle 108 for use with the housing 102 and container 104 is shown in FIGS. 12 to 17.

Figure 16:
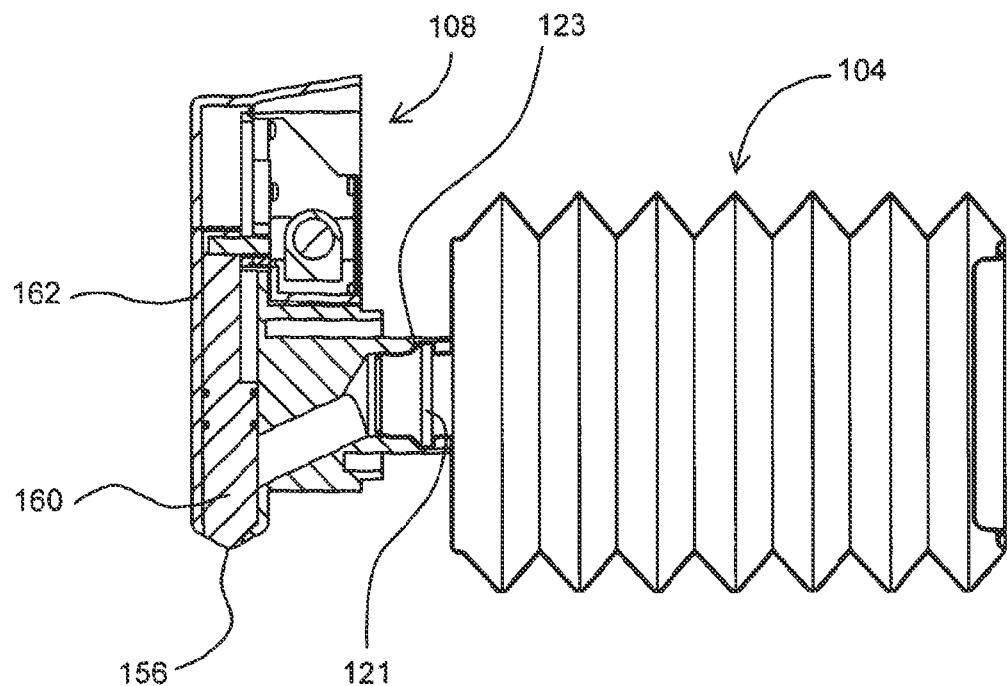
FIG. 16 is a schematic side view of a nozzle and container assembly for use the apparatus of FIG. 1, with the valve in a closed position.
Figure 17:
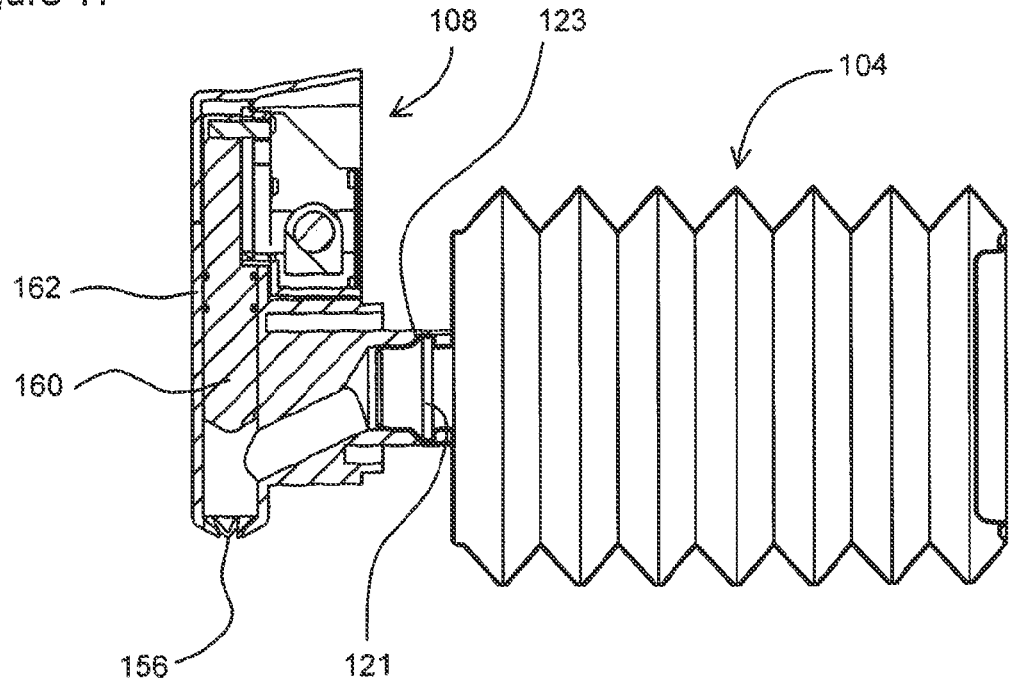
FIG. 17 is a schematic side view of the nozzle and container assembly of FIG. 16, with the valve in an open position.

In this embodiment, the dispensing nozzle 108 includes a tubular inlet 154, which is configured for receiving the neck 120 of the container 104. The inlet 154 has an inlet axis which is intended to be generally concentric with the axis of collapse of the container 104 in use. In exemplary embodiments, the inlet 154 extends inside the housing 102, so that the neck 120 of the container 104 remains inside the refrigerated housing 102 when fitted into said inlet 154. As can be seen in FIGS. 16 and 17, the annular collar 121 on the neck 114 of the container 104 is arranged with its sloping face 123 in sealing abutment with the internal surface of the inlet 154.

The dispensing nozzle 108 further includes an outlet 156 having an outlet axis generally orthogonal to the inlet axis, i.e. so as to be generally orthogonal to the axis of collapse of the container 104 in use. The dispensing nozzle 108 is fitted to or forms part of the front of the cartridge 112.

The dispensing nozzle 108 includes a valve mechanism, indicated generally at 158, having a closed condition (in which the flow of product from the outlet 156 is prevented) and an open condition (in which the flow of product from the outlet 156 is permitted). A valve member 160 is movable in a generally vertical tube 162 between a raised position, in which passage from the inlet 154 to the outlet 156 is open (FIG. 16), and a lowered position in which passage from the inlet 154 to the outlet 156 is closed (FIG. 17), and vice versa.

The valve mechanism 158 can be manually operated, e.g., via a mechanical linkage in communication with valve member 160, or may be automatically controlled. In the illustrated embodiment, a drive motor 164 is operable to move a push rod 166, in order to rotate a linkage 168 and drive movement of the valve member 160 between its closed and open positions (see FIGS. 14 and 15, respectively). Such operation of the valve mechanism 158 may be in response to a command from a control system which controls the dispensing operations of the apparatus 100, e.g., as described further below.

FIGS. 20 to 24 show a modified cartridge 112 substantially as described above, but wherein the valve mechanism 158 is manually operated. In this embodiment, the dispensing nozzle 108 includes a dispensing handle or lever 200 for manually controlling the position of a valve member 160, e.g., for switching between the closed condition in which product is blocked against passage through the nozzle 108 and an open condition in which the product is able to be dispensed through the outlet of the nozzle 108.

In this embodiment, the lever 200 is pivotable between a first position (FIGS. 20 and 22) in which the valve member 160 is in a closed position and a second position (FIGS. 21 and 23) in which the valve member 160 is in an open position. More particularly, the lever 200 is arranged to be hand-driven from a lower position to an upper position in order to raise the valve member 160 and permit flow through the nozzle 108. An appropriate mechanical linkage indicated generally at 202, is provided between the valve member 160 and the lever 200. Movement of the lever 200 from the upper position to the lower position closes the valve mechanism 160. In exemplary embodiments, the lever 200 or linkage 202 is spring-loaded to return to its closed position in the absence of manual pressure. This prevents undesired dispensing via the nozzle 108.

Figure 24:
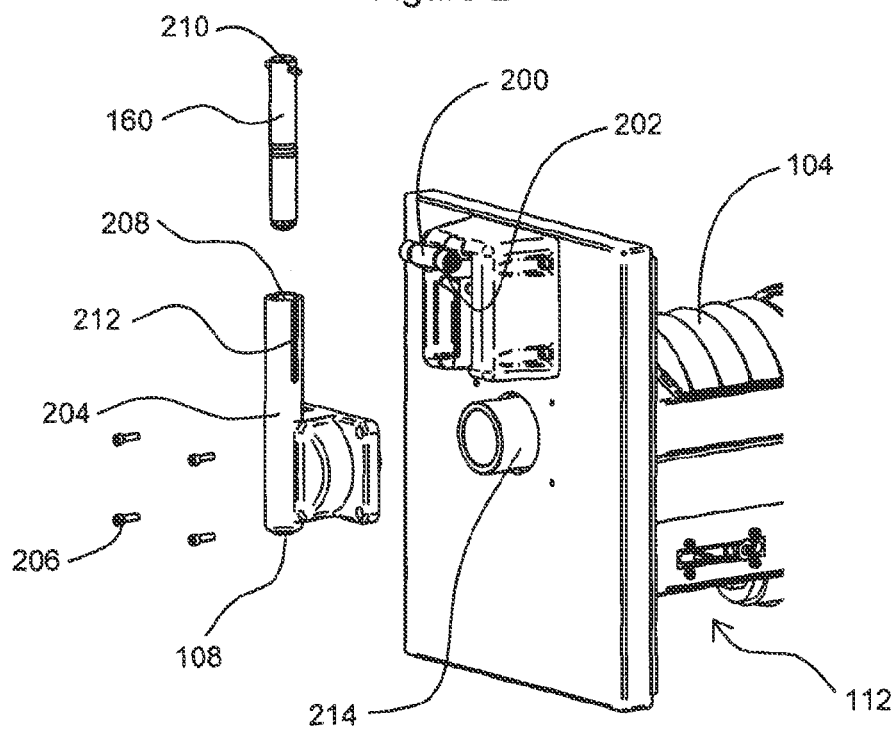
FIG. 24 is an exploded schematic perspective view of the discharge end of the cartridge of FIGS. 20 to 23.

As can be seen in FIG. 24, the nozzle 108 includes an outlet part 204 which is releasably secured on the front of the cartridge 112, e.g., by locators 206 such as screws. This enables straightforward removal of the outlet part 204 from the cartridge 112, in order to facilitate cleaning of the outlet part 204 and the valve member 160 (which is slidably removable from the outlet part 204, once the outlet part 204 has been removed from the cartridge 112).

The outlet part 204 defines a tube or sleeve 208 in which the valve member 160 can reciprocate under action of the lever 200. Food product is dispensed from the lower end of the tube 208, when the valve member 160 is in its open position.

The valve member 160 includes opposing projections 210 at its upper end, for connection of the valve member 160 to the mechanical linkage 202. The sleeve 208 includes opposing slots 212 to permit travel of the projections 210 during movement of the valve member 160 within the tube 208.

The outlet part 204 includes a tubular part which defines the inlet 154 for the neck 120 of the container 104, to provide a path of communication between the nozzle 108 and the container 104 in the cartridge 112. The inlet 154 extends inside the refrigerated housing 102, and the neck 120 of a container 104 in the cartridge 112 remains within the refrigerated housing 102 when the cartridge 112 is in its closed position. The inlet 154 may be integral with the outlet part 204 or otherwise removable from the housing 102 after removal of the outlet part 204, for cleaning purposes.

In exemplary embodiments, the inlet 154 is of heat conductive material, e.g., metallic (such as from Aluminium), to provide a thermal link between the refrigerated housing 102 and the outlet part 204 of the nozzle 108 (e.g., for maintaining product temporarily stored in the outlet part 204 at a refrigerated temperature).

Figure 20:
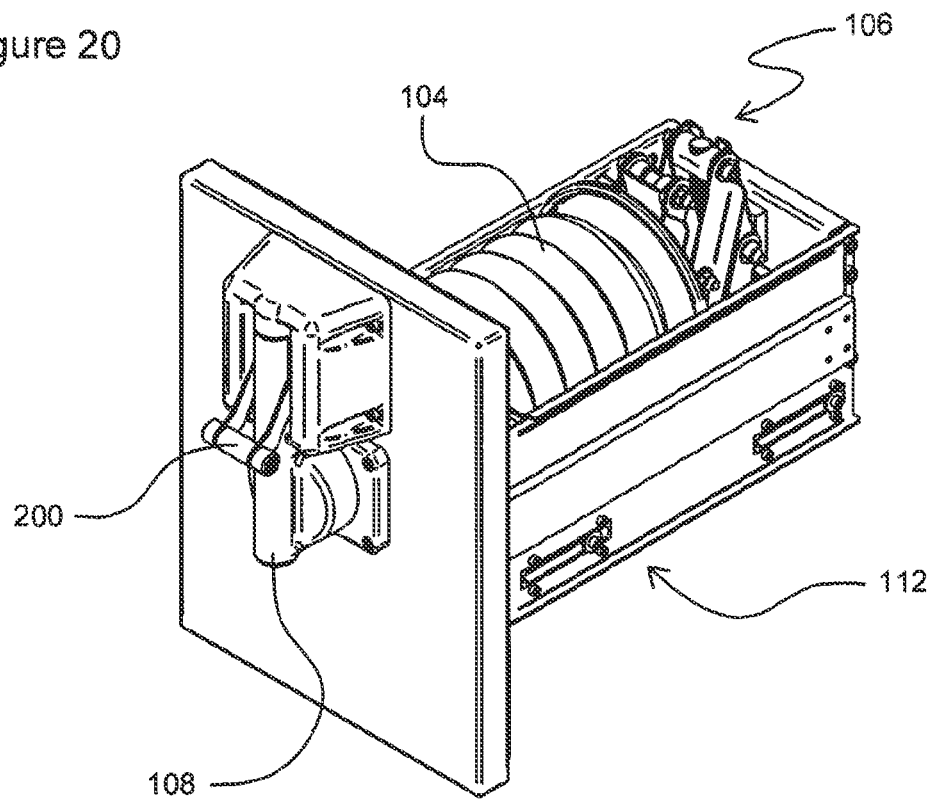
FIG. 20 is a schematic perspective view of a loaded cartridge similar to FIG. 8, but incorporating a manual dispensing lever in a closed position.
Figure 21:
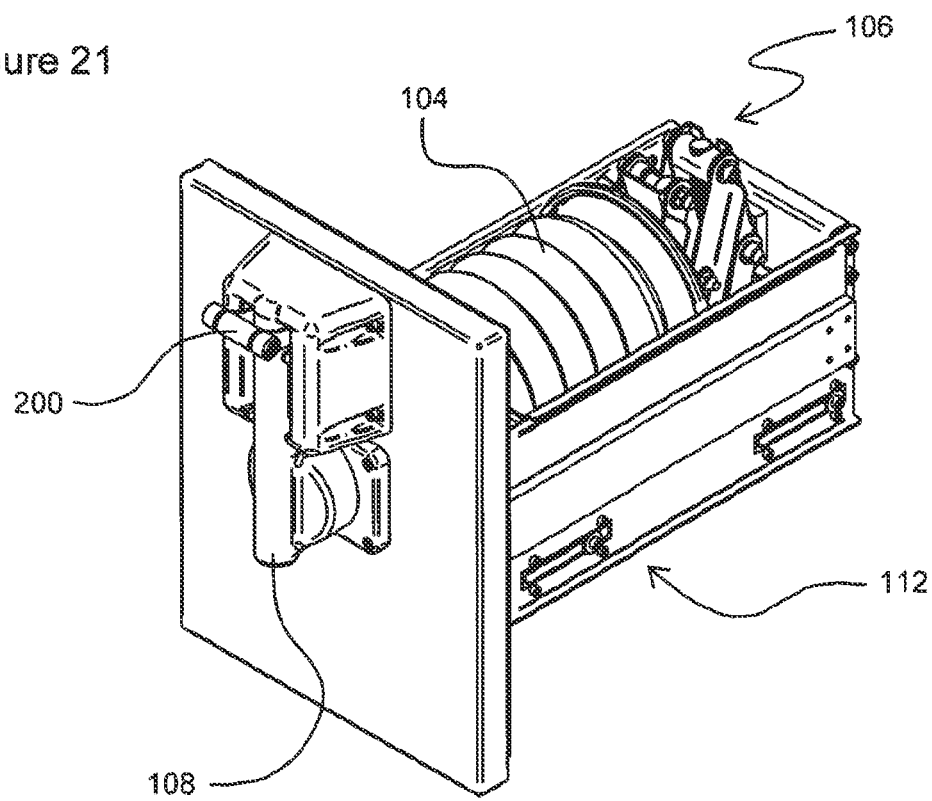
FIG. 21 is the same as FIG. 20 but shows the manual dispensing lever in an open position.
Figure 22:
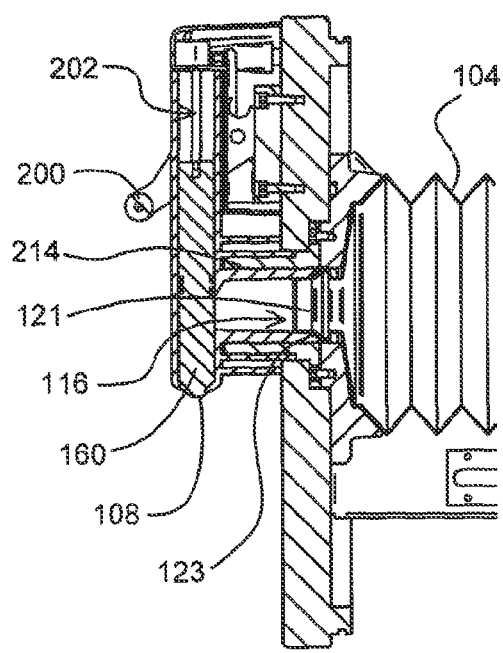
FIG. 22 is a schematic cross-sectional side view of the discharge end of the cartridge of FIG. 20.
Figure 23:
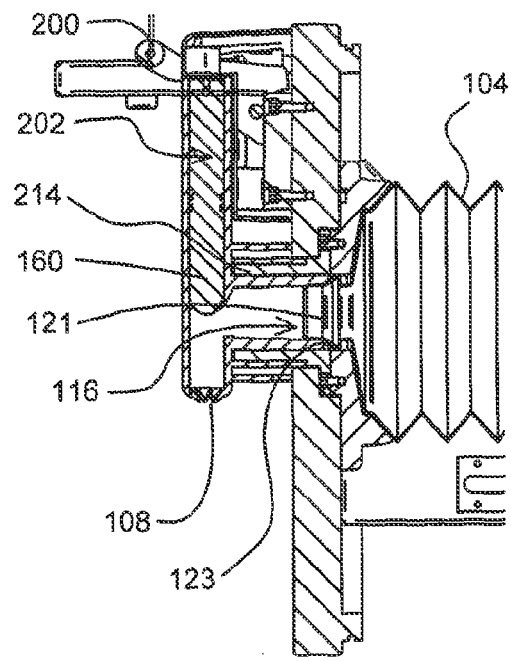
FIG. 23 is a schematic cross-sectional side view of the discharge end of the cartridge of FIG. 20.

As can be seen in FIGS. 20 and 23, the annular collar 121 on the neck 114 of the container 104 is arranged with its sloping face 123 in sealing abutment with the internal surface of the inlet 154.

As can be seen from FIG. 24, the housing 102 includes a tubular projection 214, which acts as a guide for the inlet 154.

Although not illustrated, a thermally insulated cover may be removably fitted over the nozzle 108 or the front face of the cartridge 112 when the apparatus is idle, in order to prevent or minimise heating of the nozzle 108 (and any product therein), e.g., as a result of direct sunlight. The cover may be secured by a magnetic connection, for example. A separate cover may be provided for fitting over guide 214 (see FIG. 24), when the nozzle 108 has been removed for cleaning. This cover may be held in place by the locators 206, for example.

It will be understood that operation of the dispensing mechanism 106 is automated in exemplary embodiments, e.g., via the motor 130. The apparatus 100 may include an electronic control system for controlling the automation of the dispensing mechanism 106, e.g., as indicated generally at 220 in FIG. 1. The control system 220 will typically be located inside the housing 102.

The control system 220 may be arranged in communication with the valve mechanism 158 on the apparatus 100. For those embodiments in which the apparatus 100 includes a manually controlled valve mechanism 158 for selectively permitting/preventing the flow of product from the apparatus 100 (e.g., incorporating a movable valve member 160 of the kind referred to above), the apparatus 100 may be configured so that the dispensing mechanism 106 is activated to apply a compressive load to the container 104 for a dispensing operation upon the valve mechanism 158 being switched from a closed condition to an open condition (e.g., via movement of the lever 200). Similarly, switching the valve mechanism 158 from the open condition to the closed condition will deactivate the motor 130 and thereby interrupt or end the dispensing operation. This may be achieved by the use of micro switches (not shown) in communication between the lever 200 and the control system 220, for example.

In other embodiments, the act of switching between the 'valve closed' and 'valve open' conditions can be used to control the motor 130 for a predetermined time period or predetermined operation of the motor 130 or lead screw 134, in order to automate a specific dispensing operation (e.g., for a desired portion size). The control system 220 can be programmed to close the valve mechanism 158 at the end of a portion dispensing operation.

In exemplary embodiments, the apparatus 100 is configured for dispensing a range of portion sizes. For example, the apparatus 100 may include a switch, dial or other adjustable controller, to enable an operator to preset the control system with one or more different portion sizes to be dispensed by operation of the dispensing mechanism 106 and/or valve mechanism 158. The specific volume for each portion size can be adjusted as desired via the control system 220.

In exemplary embodiments, the apparatus 100 includes a control panel or user interface, e.g., as indicated generally at 230 in FIG. 1, by means of which an operator can activate the dispensing mechanism 106, e.g., for a fully automated dispensing operation. Typically, the user interface 230 will include multiple selection options, e.g., representative of different dispensing operations, such as to dispense a small, medium and large portion sizes (indicated e.g., by price, size or volume), and/or to provide for continuous dispensing via a free serve option. This can be achieved by any suitable command input means (indicated generally at 232 in FIG. 1), such as one or more buttons, dials or a touch screen interface, for example as part of the control panel 230.

In exemplary embodiments of the apparatus 100, the control system 220 is operable in response to a selection or command made via the user interface 130 on the housing 102. In exemplary embodiments, the control system 220 is programmed to control rotation of the lead screw 134, via the drive motor 130, in response to the selection or command.

It will be understood that, in exemplary embodiments, the drive motor 130 has a rotatable output shaft or other rotatable part. An encoder, e.g., an optical rotary encoder (indicated generally at 240 in FIG. 6, by way of example) is arranged in association with said rotatable shaft/part, to enable the number of revolutions of said shaft/part to be monitored. It will be understood that the number of revolutions will equate to a relative distance of travel of the dispensing head 146 (e.g., via expansion of the scissor-type linkage 128). This data may be used to monitor the volume of product dispensed from the container 104 (and/or the volume remaining in the container 104).

In other embodiments, the encoder 240 may be arranged in association with the lead screw 134 or any other rotating part between the lead screw 134 and the motor 130, so that the number of revolutions can be monitored and equated with movement or relative position of the dispensing head 146.

It will be understood that a control system 220 of the kind discussed above can also be incorporated into those embodiments having a linear actuator or other actuator for controlling movement of the dispensing head 146 (e.g., instead of the motor-driven lead screw arrangement described above). For example, the actuator may incorporate a motor drive for driving the actuator output from a retracted position to an extended position, to drive the dispensing head 146 against the container 104 (e.g., via a mechanical linkage or other mechanism for transferring drive from the motor to the dispensing head 146). In exemplary embodiments, the motor drive includes a rotatable shaft or other rotary component, and the encoder is arranged for monitoring rotation thereof, to indicate a corresponding movement or relative position of the dispensing head 146.

The control system 220 may be programmed to retract the dispensing head 146 automatically to a fully retracted position (remote from the closed end 120 of the container 104 and spaced therefrom to enable the container 104 to be removed and replaced), hereinafter referred to as its 'home' position, when the encoder data indicates that a predefined number of revolutions of the motor output has been reached or that a specific position of the dispensing head 146 has been reached (e.g., indicative that the container is substantially empty). The control system 220 may be programmed to reset the readings from the encoder 240, each time the dispensing head 146 is returned to its home position (e.g., when retracted fully to replace a container 104).

Since each revolution of the motor output will relates to a specific degree of linear travel of the dispensing head 146, a predefined number of revolutions can be used to indicate a specific portion size of product dispensed from the container 104 via the dispensing mechanism 106. This can be converted into volume data, so that the control system 220 can be programmed to calculate the volume of product left in the container 104 at any given time. This data may be stored internally or communicated to a remote location, e.g., a central control station (indicated generally at 250 in FIG. 1).

The control system 220 can be programmed to record and transmit a variety of data, such as the time when the container 104 was deemed to be empty or in need of replacement, the volume of product and/or the number of portions (per size) remaining in the container 104, the time delay between the container being deemed to be empty and a new container being loaded into the apparatus 100, the type of portions dispensed per container/cartridge (size/time/date), the volume dispensed (volume/time/date), etc. In exemplary embodiments, this data may be accessed remotely, by wired or wireless communication with the control system 220, e.g., at any time.

The control system 220 may be programmed to stop or prevent all dispensing operations if the cartridge 112 is moved to an open position on the housing 102. The control system 220 may be programmed to lock the cartridge 112 against being opened unless the dispensing head 146 is in its home position.

An exemplary method of dispensing ice cream or other frozen or semi-frozen confection from the apparatus 100 is as follows:

Firstly, a suitably filled container 104 is loaded into the apparatus 100, with the container 104 correctly located between the dispensing nozzle 108 and the dispensing head 146, and with the valve member 160 in a closed position to prevent egress of product.

In exemplary embodiments, the container 104 is enclosed in the refrigerated housing 102 and is held at a temperature in the range of approximately −18° C. to −20° C. or lower.

A user selects a dispensing option 232 from the interface 230 on the housing 102. In general terms, the control system 220 is operable to cause the dispensing head 146 to apply a compressive load to the container 104 (e.g., through rotation of the lead screw 134). Provided that the product within the container 104 is not too hard, continued movement of the dispensing head 146 will cause the container 104 to deform under load (e.g., in a direction coaxial with its longitudinal axis X), so that product can be expressed through the outlet 116 on the container 104.

In exemplary embodiments, the control system 220 monitors data from the encoder 240 so that only a predefined number of revolutions of the motor output occurs, for dispensing a portion of product corresponding to option selected by the user. The control system 220 operates the valve mechanism 158, whereby the valve member 160 moves to its closed position to prevent further dispensing. However, if a free serve option is selected, the lead screw 134 will be rotated until the option is deselected (e.g., by releasing a button 232 on the user interface 230 on the housing 102). The control system 220 monitors data from the encoder 240, in order to assess the volume dispensed, and may activate an auto-cut off after a predefined time period or predefined number of revolutions, in order to prevent abuse of the free serve option.

In embodiments in which operation of the dispensing mechanism 106 is manually controlled (i.e. without automated portion control), the apparatus 100 may still incorporate an encoder system of the kind described above. In such embodiments, data from the encoder 240 is not used to provide portion control. Rather, the data can be used to monitor the volume of product remaining in the container and/or recording data indicative of the size of portions dispensed via each dispensing operation).

For embodiments in which the apparatus 100 includes a manual dispensing handle 200 for controlling operation of the drive motor 130, a vibrator or the like may be incorporated into or adjacent the dispensing handle 200 or nozzle for transmitting a vibration or other physical signal to the user via the handle 200, e.g., if a predetermined portion size has been reached (e.g., as determined by an encoder 240 in the manner described above).

The application of a load to the container 104 via the dispensing head 146 leads to an increase in the pressure inside the container 104, e.g., by compressing air voids inside the product within the container 104. This may lead to a radial expansion of the container, and an increase in load on the product in the container (e.g., a reaction force between the product and the stretched container material). However, it will be understood that the pressure inside the container 104 may reduce as product is dispensed, particularly if the lead screw 134 is inactive for any reason, or if the load applied to the container 104 by the dispensing head 146 is insufficient to maintain the pressure level within the container 104 at a desired level as the container is compressed.

For any given frozen or semi frozen product to be dispensed, there will be a minimum pressure value that is required in order to cause the product to express from the outlet. In exemplary embodiments, a control system (e.g., the same control system 220 for the dispensing mechanism 106) is programmed to monitor the pressure inside the container 104 during dispensing operations, e.g., in order to maintain a sufficient pressure for express of product from the container 104.

Figure 10:
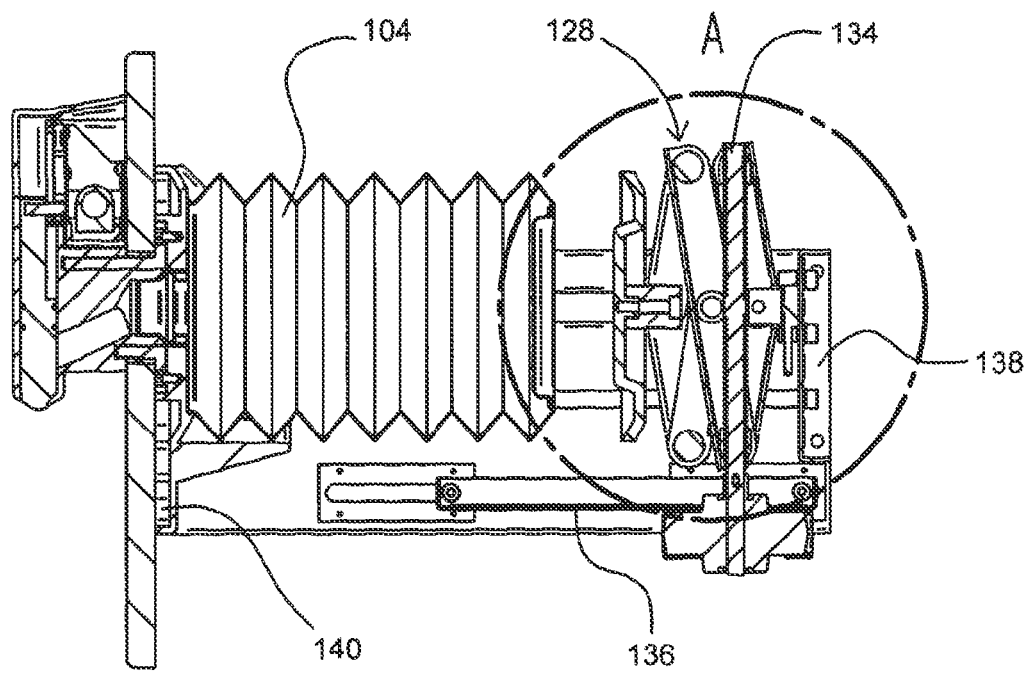
FIG. 10 is a schematic side view of the loaded cartridge of FIG. 8.
Figure 11:
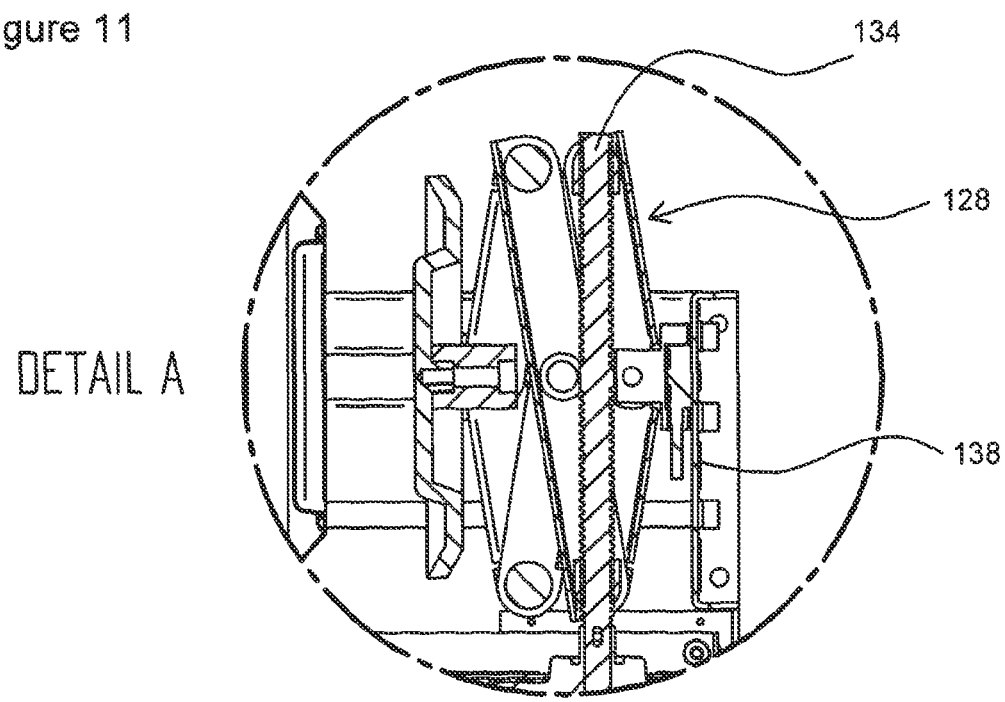
FIG. 11 is an enlarged section from FIG. 10.
Figure 12:
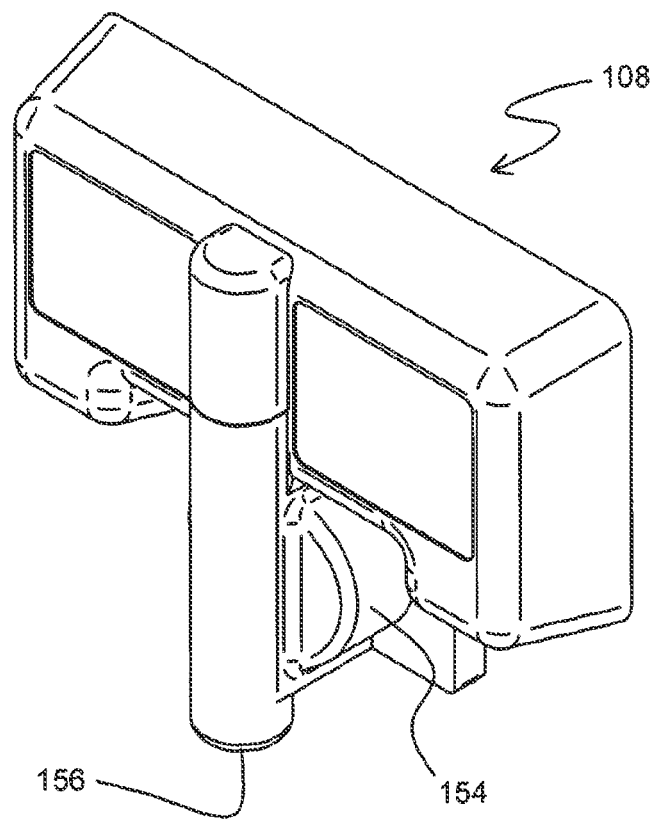
FIG. 12 is a schematic perspective view from the front of a nozzle mechanism for use in the apparatus of FIG. 1.
Figure 13:
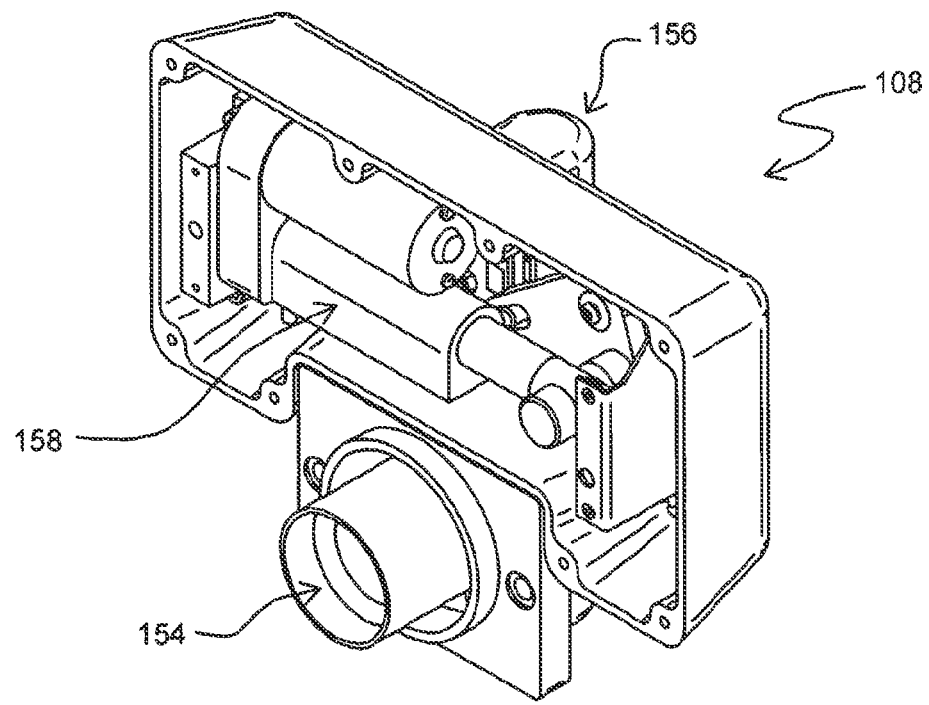
FIG. 13 is a schematic perspective view from the rear of the nozzle mechanism of FIG. 12.
Figure 14:
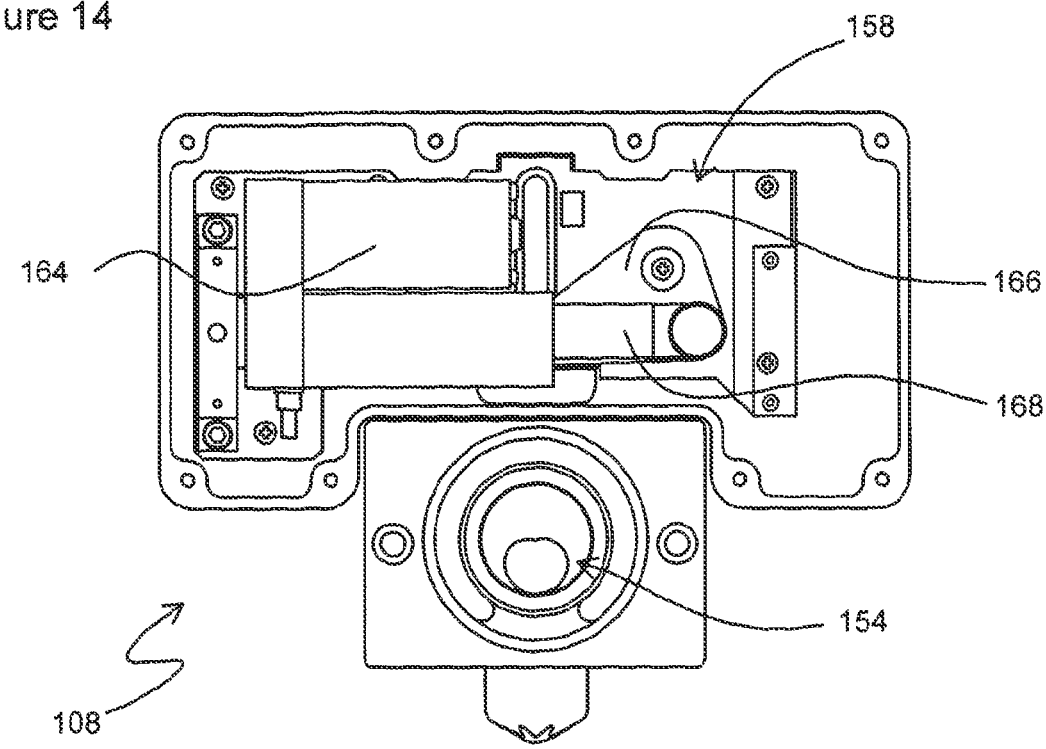
FIG. 14 is a schematic view of the rear of the nozzle mechanism of FIG. 12, in a closed condition.
Figure 15:
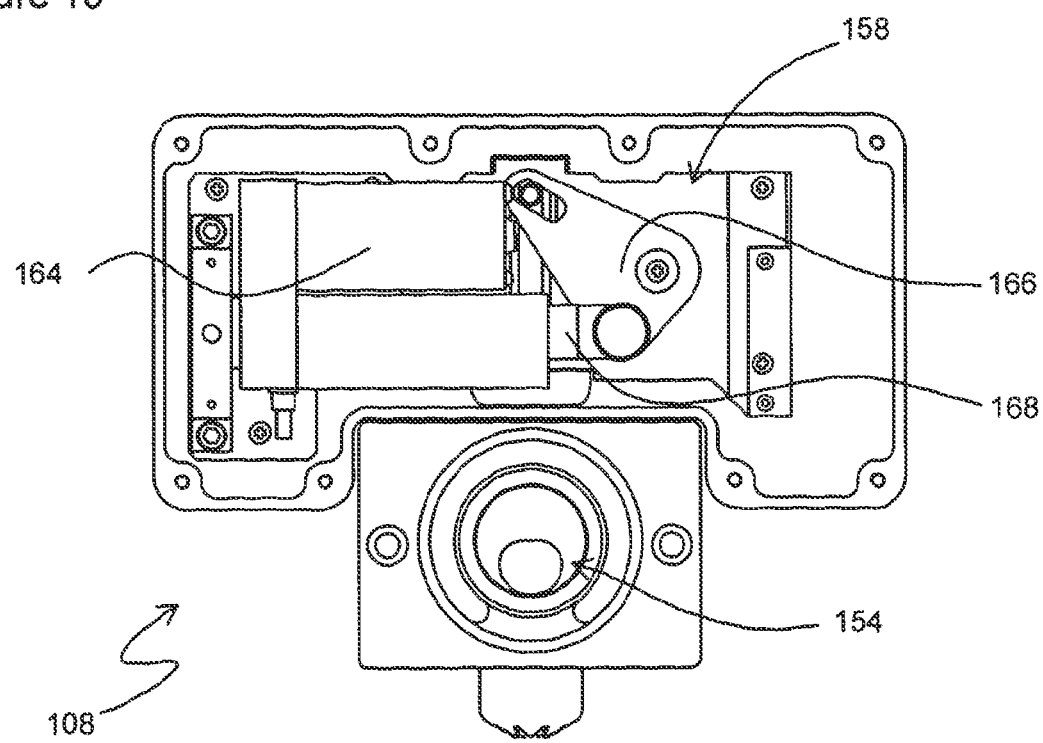
FIG. 15 is a schematic view of the rear of the nozzle mechanism of FIG. 12, in an open condition.

In exemplary embodiments, e.g., as shown in FIGS. 10 and 11, a load cell 170 is provided to monitor pressure during a dispensing operation. In the illustrated embodiment, the load cell 170 forms part of the dispensing mechanism 106 and is arranged between the rear wall 138 and the linkage 128. The apparatus and methods described herein may incorporate other force detection devices (e.g., strain gauges or relief valve systems) suitable for monitoring changes in pressure within the container 104 during a dispensing operation (e.g., for detecting the reaction force from the container 104 under load from the dispensing head 146).

Alternatively, the control system 220 may be configured to monitor electrical changes during a dispensing operation, e.g., changes in motor current, in order to indicate changes in pressure inside the container 104.

In exemplary embodiments, the control system 220 can operate to automatically reduce, interrupt or cease operation of the drive motor 130 if the pressure exceeds a threshold value, e.g., indicative that the product is too hard to be expressed. The load applied by the dispensing head 146 can then be increased after a short time period, e.g., as a check to see whether the product is still too hard to be expressed. If the pressure remains at a 'too hard' level, the motor can be automatically reversed, in order to retract the dispensing head 146 and present the container 104 ready for replacement with another container 104. The motor 130 may have a higher voltage applied when the dispensing head 146 is being moved in a return direction, e.g., to minimise the time required during changeover of containers 104.

In exemplary embodiments, the dispensing head 146 is used to apply a compressive load to the container 104 before the control system 220 operates to open the valve mechanism 158, e.g., to generate a predetermined pressure within the container 104 suitable for expressing the product from the container under normal conditions. In exemplary embodiments, this step is carried out when a new container 104 is loaded and the cartridge 112 closed. The control system 220 may be programmed to hold the dispensing head 146 at that position or pressure for a pre-set time period, e.g., in 'ready to dispense' condition. The dispensing head 146 can be automatically reversed to a 'stand-by' condition (e.g., with a reduced or relieved load on the container 104) if the control system 220 detects that the dispensing head 146 has been held in 'ready' mode for a pre-set time period without carrying out a dispensing operation. Similarly, the control system 220 may move the dispensing head 146 to a 'ready to dispense' condition after each dispensing operation, followed by automatic retraction to a 'stand-by' condition if the control system 220 detects that the dispensing head 146 has been held in its 'ready to dispense' mode for a pre-set time period without carrying out a further dispensing operation. In exemplary embodiments, the 'stand-by' pressure is low enough to eliminate or minimise loss of overrun in the product within the container 104 (which might otherwise occur if the container 104 was continually held at a 'ready to dispense' condition). In exemplary embodiments, the 'stand-by' pressure is sufficient to maintain the outlet 116 in appropriate communication with the dispensing nozzle 108, e.g., with the sealing face 123 on the collar 121 in sealing abutment with the inlet 214.

If the pressure data indicates that the pressure inside the container 104 is sufficient to cause product to express from the outlet 116, the control system 220 can reduce or temporarily interrupt operation of the drive motor 130. It may be desirable to indicate an upper threshold at which point the control system 220 will be configured to temporarily deactivate the drive motor 130. Of course, this will lead to a reduction in the pressure inside the container 104. However, the control system 220 can be configured to re-activate the drive motor 130 when the detected pressure reaches a minimum required value. This process can be repeated as necessary for a desired dispensing operation (e.g., for dispensing a particular portion size as selected by a user of the apparatus 100), wherein the operation of the motor is regulated to maintain the pressure between said upper and lower thresholds.

For those embodiments which rely on electrical changes to indicate the state of pressure within the container 104, the motor 130 may be controlled to operate at a first speed in order to increase the pressure on the container 104 (for the 'ready to dispense' condition) until a predetermined level is reached (e.g., indicated by the current of the motor 130). The valve mechanism 158 may then be triggered to open, which in turn triggers a second speed for compressing the container and expressing product through its outlet 116. The time period of the operation at said second speed (which may be lower than the first speed) can be set to desired level relevant for dispensing a specific size of portion.

Importantly, the encoder 240 provides accurate data for the relative movement or position of the dispensing head 146, which enables the control system 220 to provide accurate portion control. This is particularly the case when operation of the dispensing head 130 is being regulated between the upper and lower thresholds.

In exemplary embodiments, a biasing element, e.g., a spring or Belville washer (not shown) is installed with or forms part of the dispensing mechanism 106, and is arranged for biasing the end of the container 104 against the front plate of the frame, for reducing the motor load required to drive the dispensing heading 146 in a dispensing direction.

In exemplary embodiments, the dispensing head 146 remains in contact with the container 104 (e.g., at a degree of compression of the container 104), so that the time to reach the required 'ready to dispense' pressure is kept to a minimum.

The control system 220 may be programmed to generate a signal once the container 104 is deemed to be empty or substantially empty, or when an estimated number of portions or estimated product volume to be dispensed from the container 104 has been reached, in order to minimise downtime. The control system 220 may be programmed to monitor the estimated volume of product or estimated number of portions remaining in the container 104, and to generate a signal to indicate that a replacement container is due or may be imminent (e.g., within a predetermined number of portions or within a pre-determined volume remaining).

In each case, the signal related to the empty or imminently empty state of the container 104 may be generated in relation to the relative position of the dispensing head 146. For example, the control system 220 may be programmed to monitor the distance of travel of the dispensing head 146 or the number of revolutions of the lead screw 134, to indicate that the container 104 is (or soon will be) in a fully compressed state. A switch may be included, to be triggered if the dispensing head 146 travels beyond a certain position, indicative of a substantially compressed container 104. This switch or any signal related to the empty state of the container 104 may provide an override function for the dispensing mechanism 106, to prevent operation of the dispensing head 146 when the volume of product in the container is below a predefined level. At this point, the control system 220 may be programmed to return the dispensing head 146 automatically to the fully retracted position, ready for an unloading and reloading operation.

In exemplary embodiments, the control system 220 is configured for automatically activating heater tape or other de-icing means provided between the cartridge 112 and the refrigerated housing 102, to break down ice build up between the sliding parts and regions of abutment between the cartridge 112 and the housing 102 to facilitate easy opening of the cartridge 112 for an unloading/reloading operation, e.g., during or after retraction of the dispensing head 146.

The control system 220 may be programmed to record the time elapsed between the generation of the 'empty' signal for a first container and the generation of a 'ready to dispense' pressure of a second (replacement) container 104.

Signals and data from the control system 220 may be transmitted by a hard wired or wireless link to a remote central control station 250 (e.g., as shown in FIG. 1) or other remote manager (e.g., by email, telephone call or MMS to a store manager or other employee tasked with monitoring the operative state of the machine). The data can be formatted and transmitted in which ever electronic format(s) and to which ever location(s) is desired by the control station or remote manager 250.

In exemplary embodiments, the control system 220 is programmed to evaluate or report the volume of product remaining in the container 104 against a time schedule, in order to determine whether the container 104 has sufficient volume for previously defined 'peak' periods of use in the day. This data can be used to ensure that a suitably-filled replacement container 104 is loaded ahead of known peak periods. The partially dispensed container 104 can be removed and returned to cold storage.

The control system 220 may be programmed to prevent operation of the dispensing mechanism 106 if the temperature within the refrigerated housing 102 is detected as being above a predefined level. In exemplary embodiments, this auto-shut down function may be time dependent. For example, in the event of a power cut, the temperature within the housing 102 may drop below a predefined level but be restored to a desired level after a short period of time (since power cuts in most industrial countries are commonly dealt with in a short time period), in which case the product in the container 104 will not be adversely affected in the interim period. However, where the loss of temperature is due to a mechanical fault, for example, the loss of temperature is unlikely to be restored until the fault is attended to. If the fault occurs out of normal working hours, the time period for repairing the fault may be significant, in which case the product in the container 104 is more likely to be adversely affected. The control system 220 can be programmed to prevent such product from being subsequently dispensed via the apparatus 100, and can report such critical data.

The control system 220 may be configured to switch automatically to a DE-ICE MODE every time the container 104 is deemed to be empty and/or ready for replacement, e.g., as described above.

Electrically-operated de-icing means, e.g., fan heaters/ heater tapes or the like (not shown) may be fitted to or adjacent critical areas of the dispensing mechanism 106, to prevent ice build-up and adverse noise during dispensing operations.

In exemplary embodiments, the apparatus 100 is configured so that the control system 220 can be used to operate dedicated heater systems (not shown) located in areas of the housing/cartridge to ensure a complete de-icing of the apparatus within a desired time period, e.g., to allow easy removal or opening of the cartridge, and or maintenance or cleaning of the cartridge.

It may be desirable to use containers 104 of different axial lengths for the same apparatus 100, in which case the control system 220 may be programmed to determine which length of product has been installed (through initial movement of the dispensing head 146 into a compression state of engagement with the container 104), e.g., to determine the volume of product in the container 104.

Although described with reference to a specific container 104 which is collapsible along a longitudinal axis, other forms of container may be used. For example, exemplary embodiments may include a container which takes the form of a tube and piston arrangement (not shown), wherein the tube is at least partially filled with ice cream and has a dispensing outlet or nozzle arranged for dispensing product from the tube, and wherein a piston is slidable within the tube, so as to move in response to movement of a suitably configured dispensing head 146 on the apparatus 100, so as to force product to be expressed through the outlet or nozzle. In this case, the container would not necessarily be collapsible. Encoder readings would correspond to movements of the piston within the tube, to provide portion control (e.g., according to the methods described above). In other embodiments, the container may take the form of a flexible bag of product, which can be deformed by movement of a dispensing head 146 on the apparatus 100. It may be desirable to mount the bag within a guide, such as a tube or other receptacle, in order to constrain deformation of the bag in a desired direction during movement of the dispensing head 146 on the apparatus 100, in order to establish portion control via encoder readings (e.g., according to the methods described above).

Although described with respect to an encoder-controlled dispensing operation which is linked directly to the compression of the container 104, it may be desirable to control one or more dispensing operations by 'time elapsed' during activation of the motor or lead screw or dispensing head, or during compression of the container. A time-dependent operation may be desirable when the container is full or nearly empty, if, for a particular product or container configuration, it is observed that the accuracy of the portion control via the encoder method is variable at these limits, for example. The control system 220 may be programmed to monitor changes in rate of dispensing from the container 104, in order to monitor differences in portion control using the encoder methods.

Although the above description refers to the use of rotary encoders to monitor dispensing operations, other devices may be used to provide automated portion control, such as linear encoders, linear hall effect sensors, linear potentiometers, pulse inductive (PLS) devices, linear variable differential transformers (LVDT) or any other suitable linear positioning sensors, for providing a direct feed of data relating to the relative position of the dispensing head position during a dispensing operation.

It should be noted that dispensing characteristics for any given product may change as the volume in the container decreases (e.g., due to consolidation effects and/or the loss of air/overrun in the product). For specific products, it may be possible to provide a means of calibrating the control system 220 to take account of such changes, e.g., by reference to or the creation of a look-up chart or graph representative of such changes in dispensing characteristics over time, in order to provide improved accuracy of automatic portion control. Moreover, the geometry of the scissor mechanism 128 may be such that the degree of linear travel of the dispensing head 146 is not uniform for a specific number of revolutions of the lead screw 134. The control system 220 can be programmed to account for such discrepancies.

In exemplary embodiments, the dispensing operation of the dispensing apparatus is dependent upon a payment made, e.g., by a token, coin or bank note receiver on the apparatus or by a credit card reader on the apparatus, wherein activation of the motor or movement of the dispensing head is a function of the amount of payment made.

Figure 18:
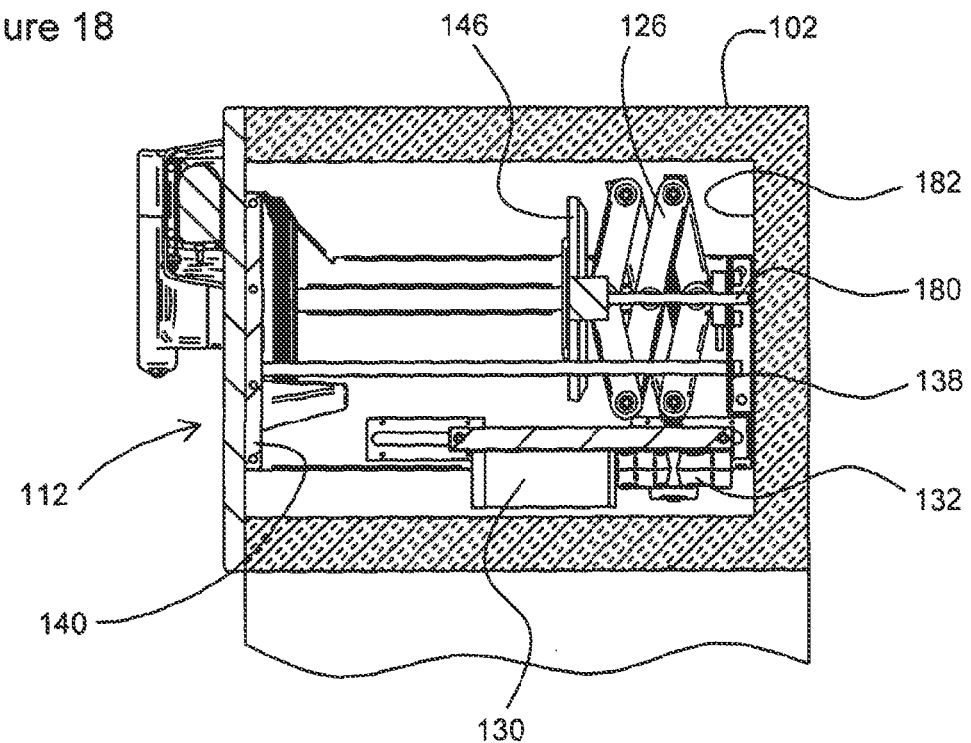
FIG. 18 is a schematic side view of an ice-breaker arrangement for the apparatus of FIG. 1, with the cartridge in a closed condition on the housing.
Figure 19:
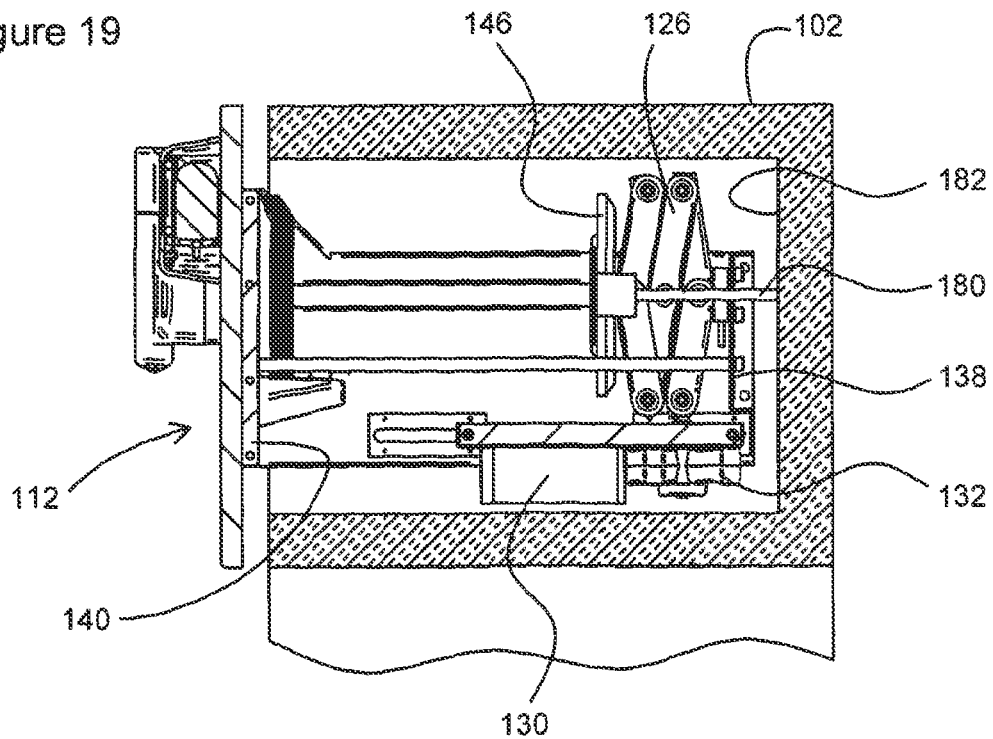
FIG. 19 shows the ice-breaker arrangement of FIG. 19, with the cartridge in a partially open condition on the housing.

A particular problem with refrigerated housing having moving parts (such as the dispensing mechanism) which might be inactive at low temperatures, e.g., in the region of $-14°$ C. to $-18°$ C. or lower, for long periods of time is the formation of ice crystals on the moving parts, since this could have a negative effect on the operating capacity of the moving parts. This is a particular problem for the movement of the cartridge 112 on the apparatus. A modified embodiment is shown in FIGS. 18 and 19, which aims to overcome this problem.

An abutment device in the form of a rod 180 is mounted on the dispensing head 146. The rod 180 extends rearwardly (e.g., relative to the front plate 140) and is parallel with the sliding axis of the drawer 112. The length of the rod if selected so that it extends beyond the rear wall 138 (e.g., through an aperture—not shown) in the rear wall 138. Then, if the linkage 128 is moved to a fully retracted position when the drawer is in a stowed condition in the apparatus 100, the rod 180 will push against an internal surface or part of the apparatus 100 (e.g., an internal wall 182 within the housing 102 in which the drawer 112 is movable), thereby causing the drawer to be pushed open from its stowed position. This has the effect of cracking or otherwise releasing any ice that has formed on the parts that cooperate to allow the drawer to be movable on the housing (e.g., guide rails in the housing and/or on the drawer itself).

Hence, the control system 220 can be configured to fully retract the linkage 128 only for the purpose of opening the drawer. A separate actuator (not shown) may be provided for fully retracting the linkage 128, i.e. separate from the drive motor 130.

In exemplary embodiments, the apparatus 100 is configured so that all power to the dispensing mechanism and/or nozzle and/or valve mechanism is cut when the cartridge 112 is moved to an open condition on the housing 102.

Figure 25:
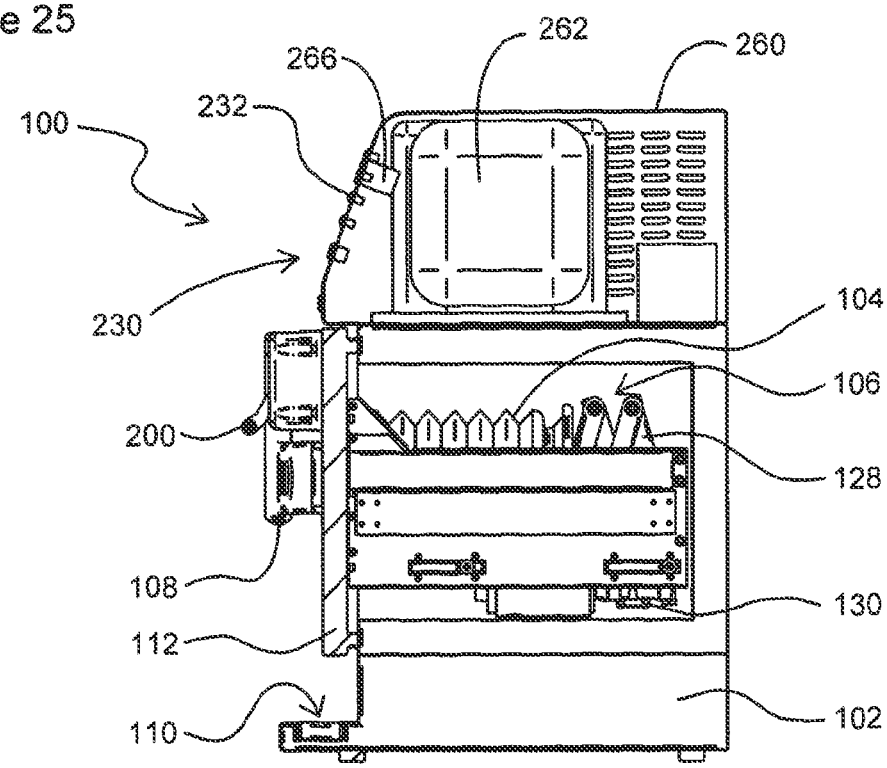
FIG. 25 is a schematic cross sectional side view showing the cartridge of FIGS. 20 to 24 in use on a modified dispensing apparatus incorporating a top mounted refrigeration unit and user interface.
Figure 26:
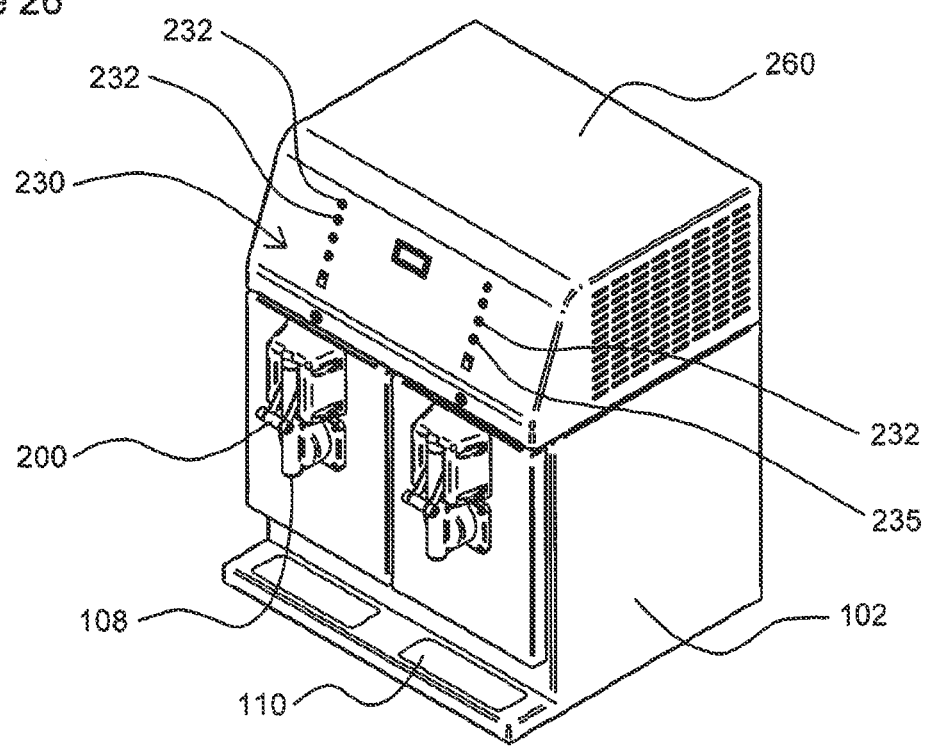
FIG. 26 is a schematic perspective view from the front of the apparatus of FIG. 25.
Figure 27:
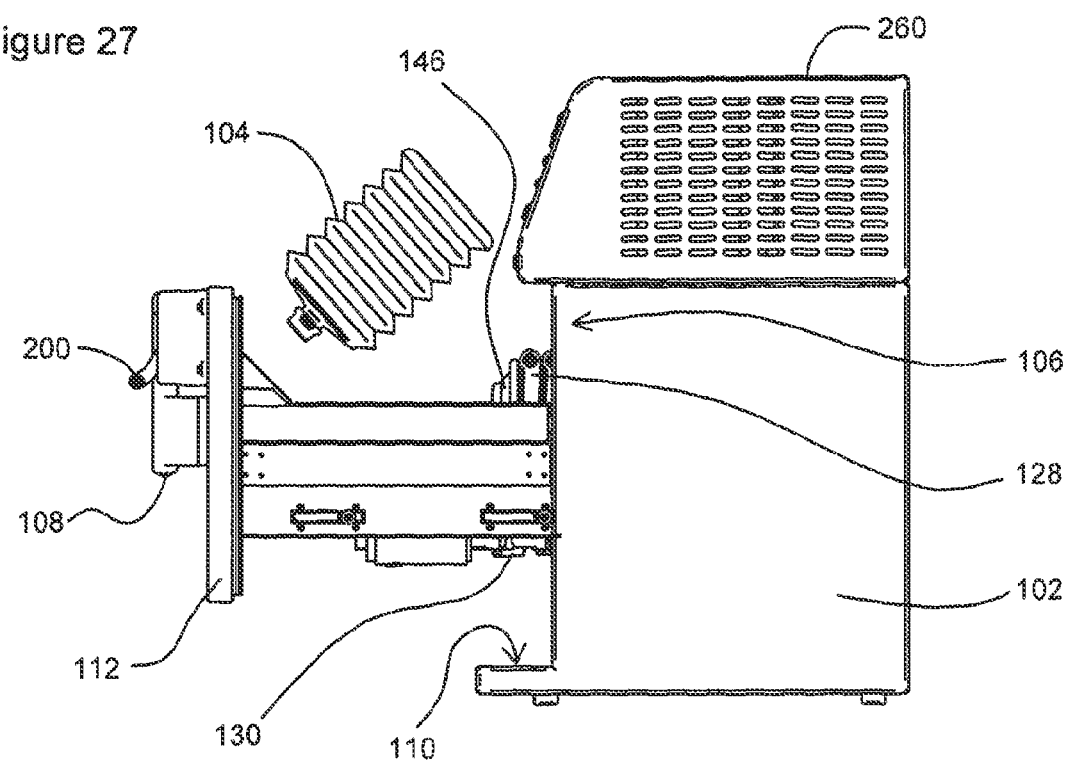
FIG. 27 is a schematic side view of the apparatus of FIGS. 35 and 26 with the cartridge in an open position extending from the front of the apparatus.

Referring now to FIGS. 25 to 27, there is shown an apparatus 100 which is constructed and is operable in substantially the same manner as the various embodiments already described above. However, in this embodiment, a compartment 260 is provided on top of the housing 102, in which a refrigeration unit (indicated generally at 262, and including a compressor and a condenser) is provided for refrigerating the housing 102. Also, the user interface 230, command inputs 232 and a control unit 266 (which houses the circuitry etc. for the control system 220) are provided in the top compartment 260, so as to be remote from the refrigerated environment inside the housing 102.

The housing 102 includes one or more fans and an evaporator (not shown) in communication with the refrigeration unit 262.

Figure 28:
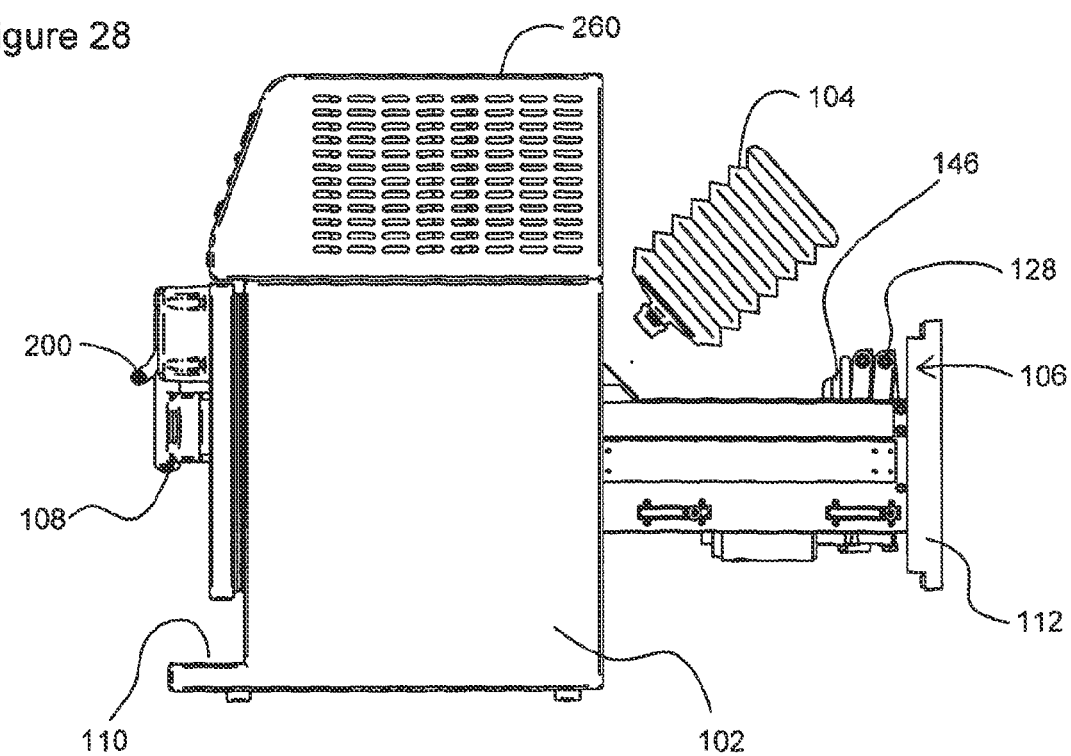
FIG. 28 is similar to FIG. 27, but shows a variant in which the cartridge opens from the rear of the apparatus.
Figure 29:
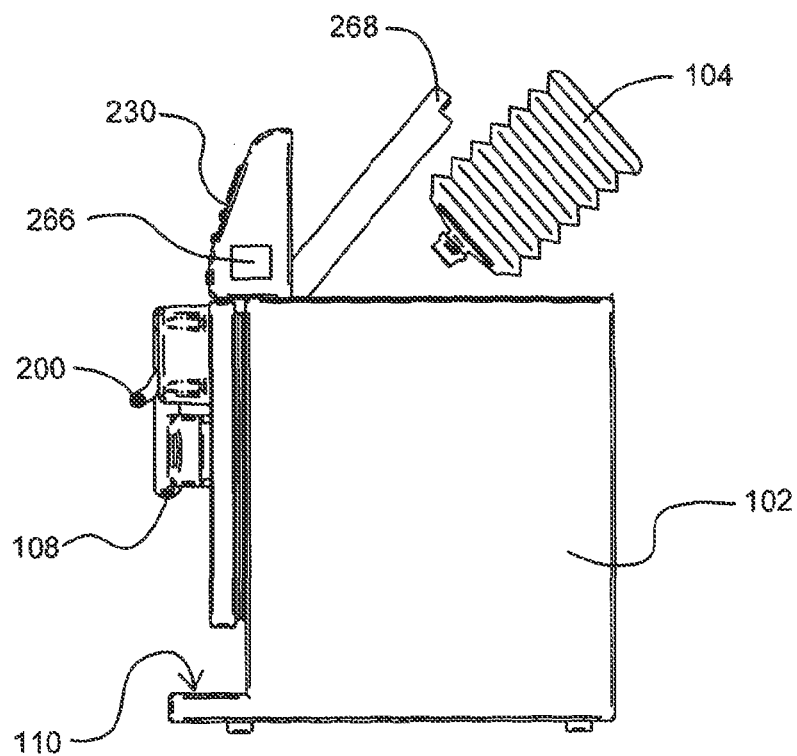
FIG. 29 is similar to FIGS. 27 and 28, but shows a variant in which the container is loaded through a door in the top of the apparatus.
Figure 30:
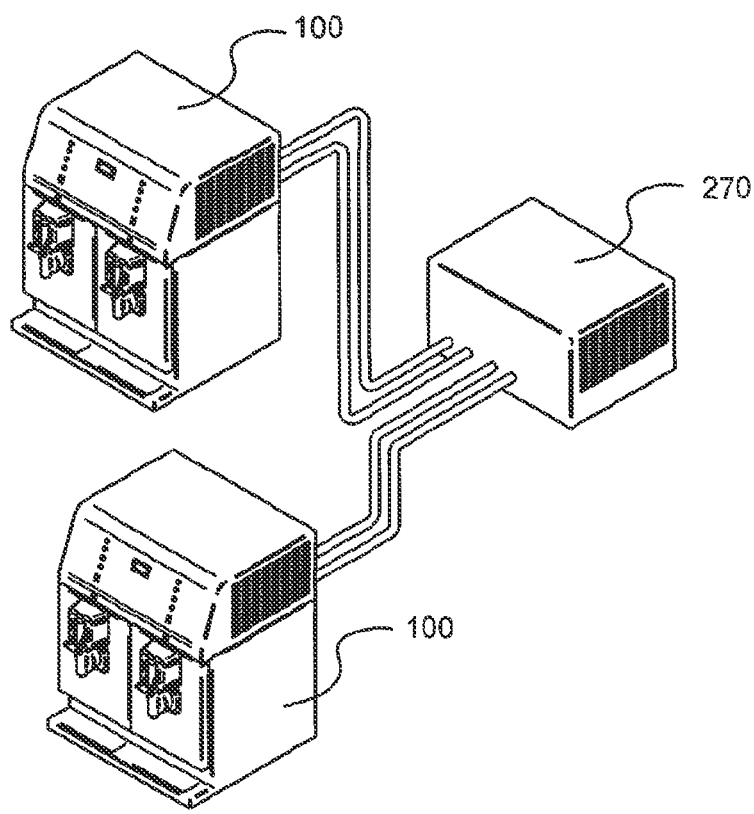
FIG. 30 is a schematic perspective view showing multiple dispensing apparatus in communication with a remote refrigeration unit.

As can be seen clearly from FIGS. 25 and 27, the housing 102 includes a cartridge 112 and dispensing mechanism 106 of the kind described above, wherein the container 104 is loaded into the cartridge 112 via through the front of the housing 102. A modified variant is shown in FIG. 28, in which the cartridge 112 slides out from the back of the housing 102. In further modified variants, the housing may include a top door 268 which can be opened, for loading the container 104 directly into housing 102 (e.g., without a movable cartridge, rather just a fixed frame for the dispensing mechanism 106, within the housing 102). An example is shown in FIG. 29. In this example, the refrigeration unit is incorporated into the housing 102 (i.e. are not located in a separate compartment on top of the housing 102). Alternatively, such embodiments (or, indeed, any of the embodiments described herein) may be connected to a remote refrigerator unit 270 for maintaining the respective housings 102 in a suitably refrigerated state, e.g., at temperatures in the region of $-14°$ C. or lower (such as in the region of $-18°$ C. or lower). An example of such an arrangement is shown in FIG. 30.

Dispensing data stored in the apparatus 100 (e.g., recorded by the control system 220) can be accessed on demand, and/or can be sent to a third party for processing.

In busy outlets, many portions may need to be dispensed in a short period of time. The apparatus 100 may therefore be configured to provide automatic dispensing of multiple portions (e.g., of a preset portion size) with a preset delay between individual dispensing operations.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A dispensing apparatus for dispensing frozen or semi-frozen product, the dispensing apparatus comprising a bulk container for storing multiple portions of product to be dispensed, wherein the container has an outlet and is of deformable construction, for reducing the internal volume of the container and expressing product through the outlet, a dispensing mechanism for applying pressure to said container to cause frozen or semi-frozen product to be dispensed from the container through the outlet, and a valve mechanism for controlling the volume of frozen or semi-frozen product dispensed from the apparatus, wherein the dispensing mechanism includes a dispensing head which is movable to apply a load to the container,
  wherein the dispensing apparatus includes a housing and said container is mounted in a drawer or cartridge which is movable on the housing between an open position for loading or unloading the bulk container and a stowed position for a dispensing operation,
  wherein the drawer or cartridge is arranged for sliding movement relative to the housing between the open and stowed positions,
  wherein the container is loaded directly into the drawer or cartridge, when the drawer or cartridge is in an open position,
  wherein the drawer or cartridge defines an open topped compartment, having a base, opposing sides perpendicular to the base, and two ends orthogonal to the sides, so that the container can be loaded into the drawer or cartridge from above,
  wherein the dispensing mechanism is mounted on the drawer or cartridge, and
  wherein the drawer or cartridge is configured to be removable from the housing, for cleaning or maintenance.

2. The dispensing apparatus of claim 1 wherein the drawer or cartridge is arranged on guide rails or another mechanical arrangement between the drawer or cartridge and the housing.

3. The dispensing apparatus of claim 1 wherein movement of the drawer or cartridge occurs on a substantially horizontal axis relative to gravity.

4. The dispensing apparatus of claim 1 wherein the dispensing mechanism is arranged for travel with the drawer or cartridge.

5. The dispensing apparatus of claim 1 wherein the dispensing mechanism is mounted on an end wall of the compartment.

6. The dispensing apparatus of claim 1 wherein the housing includes a lock arrangement configured to prevent opening or movement of the drawer or cartridge relative to the housing when the dispensing mechanism is operational.

7. The dispensing apparatus of claim 1 wherein the housing incorporates multiple drawers or cartridges, each configured to receive a container and each having its own dispensing mechanism for expressing product from the container.

8. The dispensing apparatus of claim 7 wherein the drawers or cartridges are arranged side-by-side for parallel sliding movement within the housing.

9. The dispensing apparatus of claim 1 wherein the dispensing mechanism incorporates a scissor-type linkage which is movable between a retracted position and an extended position, for compressing a container via the dispensing head.

10. The dispensing apparatus of claim 9 wherein the axis of movement of the linkage is generally horizontal relative to gravity and/or parallel with the axis of movement of the drawer or cartridge within the housing.

11. The dispensing apparatus of claim 9 wherein the dispensing mechanism includes a motor for powered rotation of a lead screw, wherein the lead screw cooperates with the scissor-type linkage, so that rotation of the lead screw in a first rotation direction causes movement of the linkage in a first displacement direction and vice versa.

12. The dispensing apparatus of claim 9 wherein the scissor-type linkage includes at least four linkage members arranged for pivoting movement relative to one another, in order to extend or retract the position of the dispensing head.

* * * * *